US010437694B2

(12) United States Patent
Segger

(10) Patent No.: US 10,437,694 B2
(45) Date of Patent: Oct. 8, 2019

(54) REAL TIME TERMINAL FOR DEBUGGING EMBEDDED COMPUTING SYSTEMS

(71) Applicant: Rolf Segger, Nassau (BS)

(72) Inventor: Rolf Segger, Nassau (BS)

(*) Notice: Subject to any disclaimer, the term of this patent is extended or adjusted under 35 U.S.C. 154(b) by 439 days.

(21) Appl. No.: 15/185,733

(22) Filed: Jun. 17, 2016

(65) Prior Publication Data

US 2016/0292057 A1 Oct. 6, 2016

Related U.S. Application Data

(63) Continuation-in-part of application No. 14/256,335, filed on Apr. 18, 2014, now Pat. No. 9,384,106.

(60) Provisional application No. 61/943,058, filed on Feb. 21, 2014.

(51) Int. Cl.
*G06F 11/26* (2006.01)
*G06F 11/07* (2006.01)
*G06F 11/36* (2006.01)
*G06F 11/34* (2006.01)
(Continued)

(52) U.S. Cl.
CPC ............ *G06F 11/26* (2013.01); *G06F 11/079* (2013.01); *G06F 11/2294* (2013.01); *G06F 11/3013* (2013.01); *G06F 11/3476* (2013.01); *G06F 11/3656* (2013.01); *G06F 11/3664* (2013.01); *G06F 11/3688* (2013.01); *G06F 11/3058* (2013.01); *G06F 2201/805* (2013.01); *G06F 2201/865* (2013.01); *G06F 2201/875* (2013.01)

(58) Field of Classification Search
CPC .. G06F 7/78; G06F 8/00–78; G06F 9/44–455; G06F 11/36; G06F 11/3688

USPC .................................................. 717/124, 125
See application file for complete search history.

(56) References Cited

U.S. PATENT DOCUMENTS 5,737,516 A 4/1998 Circello et al.
5,872,909 A * 2/1999 Wilner ................ G06F 11/0715
714/38.12
(Continued)

FOREIGN PATENT DOCUMENTS

CN 103218338 7/2013
KR 10-2006-0006110 1/2006

OTHER PUBLICATIONS

"Redefining low-level library functions to enable direct use of high=level library functions in the C library", Libraries and Floating Point Support Guide, http://www.kell.com/support/man/docs/armlib/armlib_CJAIABCF.html , accessed on Apr. 9, 2014.
(Continued)

*Primary Examiner* — Phillip H Nguyen
(74) *Attorney, Agent, or Firm* — Knobbe Martens Olson & Bear LLP

(57) ABSTRACT

One or more circular debug buffers can allow terminal output data to be provided from the target system to a host without halting the target system or causing significant delays. One or more circular debug buffers may also allow input (such as keyboard input) to be provided from the host to the target without halting the target system or causing significant delays. Accordingly, communications between the target and host may be performed in real time or near real time. These communications may be used for debugging purposes or more generally, for any purpose, including purposes unrelated to debugging.

20 Claims, 16 Drawing Sheets

(51) Int. Cl.
*G06F 11/22* (2006.01)
*G06F 11/30* (2006.01)

(56) References Cited

U.S. PATENT DOCUMENTS

| | | | | |
|---|---|---|---|---|
| 5,978,902 | A * | 11/1999 | Mann | G06F 11/348 |
| | | | | 712/227 |
| 6,142,683 | A * | 11/2000 | Madduri | G06F 11/348 |
| | | | | 703/23 |
| 6,356,960 | B1 * | 3/2002 | Jones | G06F 11/3656 |
| | | | | 710/5 |
| 6,892,324 | B1 | 5/2005 | French et al. | |
| 6,901,581 | B1 * | 5/2005 | Schneider | G06F 11/3636 |
| | | | | 714/E11.212 |
| 7,024,588 | B2 | 4/2006 | Imai et al. | |
| 8,001,531 | B1 * | 8/2011 | Rideout | G06F 11/3664 |
| | | | | 709/217 |
| 8,006,232 | B1 * | 8/2011 | Rideout | G06F 11/3664 |
| | | | | 709/217 |
| 2003/0023956 | A1 * | 1/2003 | Dulberg | G06F 11/3624 |
| | | | | 717/130 |
| 2003/0233601 | A1 | 12/2003 | Vaid et al. | |
| 2004/0243663 | A1 * | 12/2004 | Johanson | G06F 9/542 |
| | | | | 709/200 |
| 2008/0307134 | A1 * | 12/2008 | Geissler | G06F 13/4291 |
| | | | | 710/110 |
| 2009/0037774 | A1 * | 2/2009 | Rideout | G06F 11/362 |
| | | | | 714/38.1 |
| 2009/0254886 | A1 | 10/2009 | Elliot | |
| 2010/0017185 | A1 * | 1/2010 | Bade | G06F 17/5022 |
| | | | | 703/13 |
| 2011/0119656 | A1 * | 5/2011 | Lee | G06F 11/366 |
| | | | | 717/128 |
| 2011/0179252 | A1 * | 7/2011 | Master | G06F 15/17362 |
| | | | | 712/30 |
| 2012/0066551 | A1 * | 3/2012 | Palus | G06F 11/28 |
| | | | | 714/39 |
| 2012/0331346 | A1 * | 12/2012 | Oshima | G01R 31/31919 |
| | | | | 714/32 |
| 2013/0339790 | A1 * | 12/2013 | Menon | G06F 11/27 |
| | | | | 714/30 |
| 2014/0013157 | A1 * | 1/2014 | Hopkins | G06F 11/2205 |
| | | | | 714/30 |
| 2014/0053026 | A1 * | 2/2014 | Zhong | G06F 11/3648 |
| | | | | 714/39 |
| 2014/0143463 | A1 * | 5/2014 | Mou | G06F 11/349 |
| | | | | 710/110 |

OTHER PUBLICATIONS

"RealView Compilation Tools" Version 4.0, Developer Guide. 2002-2010.
AutoSar, Specification of Debugging in Autosar, V1.2.0 R4.0 Rev 3, accessed on Apr. 7, 2014.
Sporrong, "Live Broadcast from inside your embedded system", IAR Systems, accessed on Apr. 7, 2014.
Products: PROMJet: Flash Memory In-Circuit Debug, Flash & Memory Emulators for Embedded Systems: In-Circuit Debug, http://www.emutec.com/flash_ice_debugger_software_promjet.php, accessed on Mar. 31, 2014.

* cited by examiner

FIG. 10

REAL TIME TERMINAL FOR DEBUGGING EMBEDDED COMPUTING SYSTEMS

RELATED APPLICATION

This application is a continuation-in-part application of U.S. application Ser. No. 14/256,335, filed Apr. 18, 2014, entitled "Real Time Terminal for Debugging Embedded Computing Systems," which is a non-provisional application of U.S. Provisional Application No. 61/943,058, filed Feb. 21, 2014, entitled "Real Time Terminal for Debugging Embedded Computing Systems." The disclosures of each of the foregoing applications are hereby incorporated by reference in their entirety.

COMPUTER PROGRAM LISTING APPENDIX

A computer program listing appendix is submitted electronically in accordance with 37 C.F.R. § 1.96(c) via EFS-Web filing as an ASCII .txt file that lists a computer program listing, where some or all of the features described herein can be used or otherwise combined with any of the features described in the computer program listing. The computer program listing appendix file is entitled "Computer-program-listing.txt" and the computer program listing listed therein is hereby incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

An embedded computing system (or embedded system) may include an electrical system controlled by one or more processors or central processing units (CPUs), as well as memory and input/output (I/O) units. Examples of embedded systems include: household (whiteware) appliances, such as microwaves, dishwashers, ovens, and refrigerators; telecommunication systems such as cordless phones, cell phones, and telephone base stations; automotive systems such as antilock brake systems and engine control systems; entertainment systems such as portable audio players, movie players, and portable gaming devices; industrial systems that include industrial controls; measurement devices; medical devices; and the like.

The software or firmware for these embedded devices (often called target systems or target embedded systems herein) can be quite complex. The software is typically developed on one or multiple development computers or host systems. A debug probe can serve as a connection between the host and target system. One example of a debug probe is the J-Link™ product available from SEGGER Microcontroller GmbH & Co. KG. A debug probe can allow partial or full control of the target system, allowing (among possibly other features): halting and restarting the CPU of the target system, resetting the CPU of the target system, reading and writing registers of the CPU of the target system, reading and writing memory and peripherals of the CPU of the target system, and setting breakpoints for the CPU of the target system.

SUMMARY

In certain embodiments, a method of debugging a target embedded system can be under control of a hardware processor of a target embedded system. The method may include creating one or more circular debug buffers in a random access memory device of the target embedded system. The one or more circular debug buffers can include a first circular debug buffer that can store debug messages. The method may further include invoking, from a program executing in the hardware processor of the target embedded system, a debug subroutine. Moreover, the method may include, in response to invoking the debug subroutine, writing a first debug message from the program to the first circular buffer stored in the random access memory device. The method may also include returning flow of control from the debug subroutine to the program.

The method of the preceding paragraph may be implemented together with any sub-combination of the following features: creating the one or more circular debug buffers can include creating a second circular debug buffer that can receive input from the debug probe; creating the one or more circular debug buffers can include creating a plurality of circular debug buffers corresponding to a plurality of channels; the channels can correspond to different types of data, where the different types of data can include text data and binary data, among possibly other types of data; each of the channels can include two of the debug buffers that may include an up debug buffer for receiving communications from the debug probe and a down debug buffer for writing communications for the debug probe; creating the one or more circular debug buffers can include storing a predefined identifier in the random access memory to enable the debug probe to find an address corresponding to the one or more circular debug buffers in the random access memory; the method may further include dynamically creating a new circular buffer subsequent to said returning flow of control from the debug subroutine to the program; or the method may further include disabling one or more interrupts of the target embedded system prior to said writing the first debug message from the program to the first circular buffer stored in the random access memory device.

In certain embodiments, a system for debugging a target embedded system can include a memory device of an embedded system and the hardware processor of the embedded system. The memory device can store at least an embedded program and one or more debug buffers. The one or more debug buffers can include a first debug buffer that can store debug messages. The hardware processor of the embedded system can: execute the embedded program; invoke, from the embedded program, a debug subroutine; write a first debug message from the embedded program to the first buffer in response to invocation of the debug subroutine; and return flow of control from the debug subroutine to the program.

The system of the preceding paragraph may be implemented together with any subcombination of the following features: the one or more debug buffers can also include a second debug buffer; the second debug buffer can receive input from the debug probe; the first debug buffer can correspond to a first data channel and the second debug buffer can correspond to a second data channel; the first and second data channels can correspond to different types of data; the different types of data can include textually-formatted data and non-textually formatted serial data, among possibly other types of data; the hardware processor can also assign a network port to the first debug buffer; the debug subroutine can include a routine for printing a formatted string, where invocation of the debug subroutine can call a replacement routine that can replace a standard library implementation of the routine for printing a formatted string; the debug subroutine can include a printf routine of a C programming language; or the hardware processor can also write the first debug message without blocking the hardware processor.

In certain embodiments, a system for debugging a target embedded system can include a hardware processor of a debug probe that can: read a debug message from one or more circular buffers of a target embedded system, mark the one or more circular buffers as being read in response to reading the debug message from the one or more circular buffers, and pass the debug message to a host system.

The system of the preceding paragraph may be implemented together with any subcombination of the following features: the hardware processor can also search a memory of the target embedded system for a predefined identifier so as to identify a location of the one or more circular buffers in the memory; the hardware processor can also read the one or more circular buffers periodically without being instructed to do so by the host system; or the system may further include a network module that can assign a network port to the one or more circular buffers to enable a remote system to read the one or more circular buffers.

In certain embodiments, a system for debugging a target embedded system can include a hardware processor of a host system. The hardware processor can include executable instructions that can: access a debug message from a circular buffer of a target embedded system by sending a read command to a debug probe in communication with the target embedded system, receive the debug message from the debug probe, and provide the debug message received from the debug probe to a debugger module.

The system of the preceding paragraph may be implemented together with any subcombination of the following features: the hardware processor of the host system can also poll the debug probe periodically for new messages from the circular buffer; or the hardware processor of the host system can send the command to a second circular debug buffer of the target embedded system through the debug probe.

For purposes of summarizing the disclosure, certain aspects, advantages and novel features of several embodiments are described herein. It is to be understood that not necessarily all such advantages can be achieved in accordance with any particular embodiment of the embodiments disclosed herein. Thus, the embodiments disclosed herein can be embodied or carried out in a manner that achieves or optimizes one advantage or group of advantages as taught herein without necessarily achieving other advantages as may be taught or suggested herein.

BRIEF DESCRIPTION OF THE DRAWINGS

The features disclosed herein are described below with reference to the drawings. The drawings are provided to illustrate embodiments of the inventions described herein and not to limit the scope thereof.

FIGS. 9 and 10 depict example user interfaces for communicating with a target system.

DETAILED DESCRIPTION

I. Introduction

Figure 1:
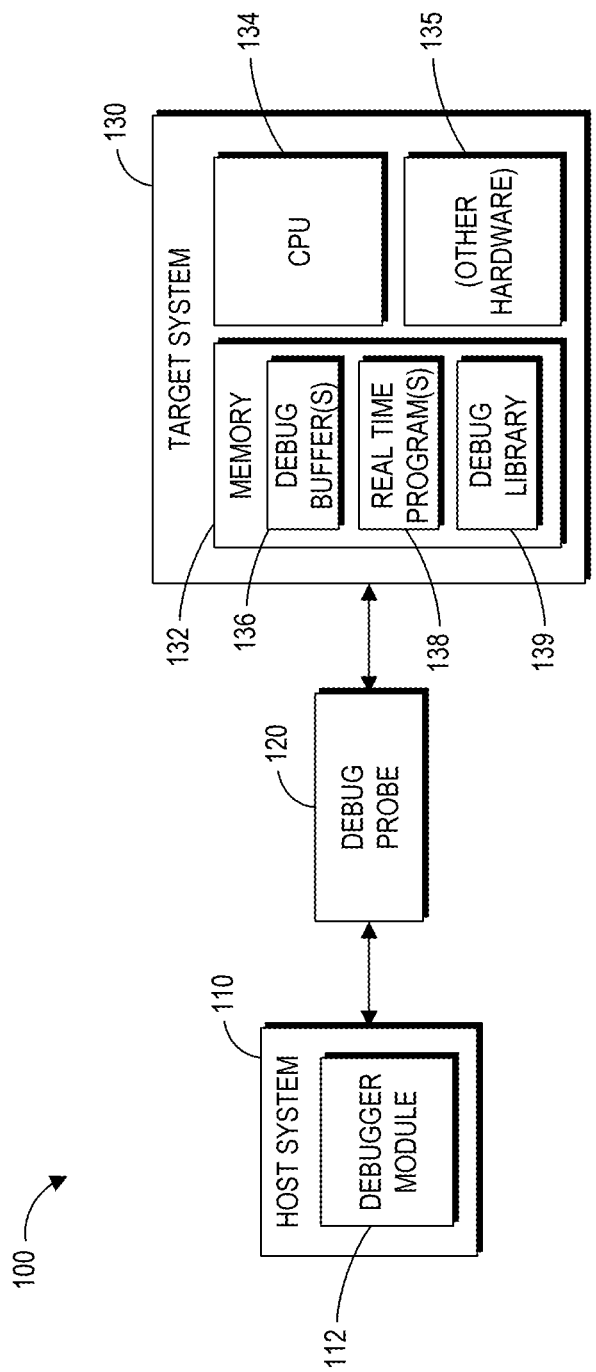
FIG. 1 depicts an embodiment of a computing environment for debugging an embedded system.

One feature that can be used in embedded systems is terminal output, which can allow the target system to send text messages to the host to assist with debugging. These text messages can be anything from simple "target system started" messages to complex messages containing measured values, firmware versions, or information about the state of the target system or problems found by the target CPU, such as "network connection down" or "supply voltage too low" or "no memory for data packet." For example, the text messages can include system information of the embedded system when the embedded system is running. Such system information may comprise a timestamp of an event of the target system (such as an interrupt, processor action, or a user-initiated event such as a debug breakpoint), event type, stack information, frequency, run time information, context of the task, CPU load, etc. These text messages (among others) can be useful for debugging an embedded system. Text messages may be provided as terminal output in response to a debugging breakpoint being reached in program code or elsewhere during execution of a program.

In some embodiments, the host includes a data visualization system which can analyze and provide visualization of system information received from the target system. For example, the data visualization system may provide a system information user interface containing a graph with timelines illustrating the system information, such as timelines of processor events or a table with processor event information. The data visualization system can allow a variety of user interactions to facilitate analyzing the data presented in the system information user interface. For example, a user can select one or more user interface controls to view, zoom in/out of the window, save data to a file for further analysis, and so on.

Currently the state of the art for outputting debugging information, such as text messages (for example, printf) includes two solutions, including a) semihosting/breakpoint technology and b) Serial Wire Output (SWO) technology. With semihosting/breakpoint systems, the CPU is halted, requiring about 10-100 ms (milliseconds) to output one text message string for terminal output. The procedure with semihosting is as follows: a function in the software of the target embedded system outputs a string or a character containing a breakpoint. When the target system encounters the breakpoint, the target system is halted. The debugger software running on the host can read the content of one or more CPU registers to determine the reason for this halt. The debugger will then read a part of the target system's memory to read the string to be output. The target system is then restarted. This leaves the target system in a halted state, in which it is totally unresponsive, for typically (depending primarily on the speed of the debug probe) about 5 ms to 50 ms. Even interrupts may not be accepted while the CPU is halted.

As a result of the delays in existing systems, debugging can interrupt the real-time operation of the system, resulting in debugging under non-real world conditions. If debugging is not conducted in real time, problems with real-time operation of an embedded system may not be properly identified. As a result, development time may be delayed to address problems with program code, and some bugs might not be properly fixed at all. What is worse is that delays due to debugging can result in catastrophic failures of an embedded system. For instance, introducing debugging delays into a machine that includes a motor controller can cause failure of that machine. Even a few milliseconds delay can cause a motor to accelerate in any direction. If the machine is a CNC (computer numerical control) machine, for example, acceleration of the motor can result in a tool of the CNC machine breaking whatever the CNC machine is making. Accordingly, it can be highly desirable to reduce delays due to debugging of an embedded system.

With the SWO technology, the embedded system can typically output debugging information via an extra pin on its processor to a hardware buffer, such as a small First-in-First-out queue (FiFo). The debugging information may be transmitted in a packet format and with universal asynchronous receiver/transmitter (UART) encoding or Manchester encoding. The SWO technique, however, can be disadvantageous because (1) it may require the frequency of the receiver and the transmitter to be similar (to avoid synchronization issues); (2) it may occupy an extra pin for outputting debugging information; and (3) it may cause disruptions of the embedded system's operation when the FiFo is full because the processor of the embedded system needs to wait before outputting additional information.

Embodiments described herein provide one or more circular debug buffers that can allow terminal output data to be provided from the target system to a host without halting the target system or causing significant delays. In some embodiments, one or more circular debug buffers may also allow input (such as keyboard input) to be provided from the host to the target without halting the target system or causing significant delays. Accordingly, communications between the target and host may be performed in real time or near real time. These communications may be used for debugging purposes or more generally, for any purpose, including purposes unrelated to debugging.

In certain implementations, the target system may also transmit data to the data visualization system in real time, while the target system is running. Advantageously, in certain embodiments, such data transfer does not require an extra pin of the target system's processor. The data transfer can occur via the debug interface (such as through an I/O port, debug buffer, or other interface, as described below with reference to FIG. 1).

As used herein, the terms "real time" and "near-real time," in addition to having their ordinary meaning, are often used herein to describe operations or actions performed sufficiently fast so as to avoid introducing perceptible delay into the operation of the target system, and may but need not mean "immediately" or "instantaneously." In addition, as used herein, in addition to having their ordinary meaning, the terms "software" and "firmware" may be used interchangeably. Further, while some example functionality is described herein with respect to the C programming language, the features described herein are not so limited. Rather, any programming language may be used to implement the features described herein.

II. Example Debugging System

Turning to FIG. 1, an example debugging system is shown 100 in which a host system 110 communicates with a target system 130 via a debug probe 120. The host system 110 can be any computing device, such as a desktop, laptop, mobile device, or even another embedded system. The host system 110 includes a debugger module, which may be debugger software that can send and/or receive data to and/or from the target system 130 through the debug probe 120. An example of such debugger software in many UNIX and Linux systems is the GDB debugger. The debugger module 112 may be loaded into a memory of the host system and may be executed in a hardware processor of the host system 110.

In the depicted embodiment, the target system 130 includes a memory 132, a central processing unit (CPU) 134, and optionally other hardware 135 such as input/output (I/O) ports, timers, data storage devices, sensors, and the like. The CPU 134 may be any hardware processor and may include a single core or multiple cores. In some embodiments, the target system 130 may include multiple discrete CPUs 134. The memory 132 may include random access memory (RAM) and/or read-only memory (ROM). In the depicted embodiment, the memory 132 includes one or more real-time programs 138 (or optionally one or more programs that do not run in real time) and one or more debug buffers 136. In one embodiment, the programs 138 are stored in ROM, while the debug buffer(s) 136 are stored in RAM. The programs 138 may also be stored in RAM in some embodiments.

The one or more debug buffers 136 (sometimes referred to herein as descriptor(s)) can contain one, two, or more cyclic or circular buffers (sometimes called ring buffers), such as one for terminal-out (messages from target 130 to host 110) and a second one (optional) for terminal-in (messages from host 110 to target 130). For each buffer 136, two pointers can be maintained, one for write operations, the other one for read operations. These pointers can point to a location in the target 130 memory 132. In another embodiment, one or more counters can be used to keep track of read and write operations in the buffer 136. For instance, a counter value of 0 can refer to the first byte of the buffer 136, a counter value of 1 can refer to the second byte of buffer 136, and a counter value of (BufferSize−1) can refer to the last byte of buffer. For convenience, the remainder of this description will primarily refer to the buffer(s) 136 as being addressed by pointers rather than by one or more counters. However, any of the embodiments herein can equally apply to a counter implementation or can be modified to work with a counter implementation of the buffer(s) 136. More generally, counters and pointers can both be considered examples of indices used to track read and write operations in a debug buffer. Other example implementations for circular buffers are described in greater detail below.

Since the one or more debug buffers 136 are circular buffers or ring buffers in an embodiment, each buffer 136 may be a fixed size (an alternative, dynamically sizable buffer embodiment is described below). When the buffer 136 is full, the buffer 136 can be written to from the start position, wrapping around circularly. When a buffer 136 is written to, a write pointer (or counter etc.) can be updated to reflect the addition of data to the buffer 136. For instance, the write pointer can be updated to point to an address that represents the end of the new data added to the buffer 136, or to an address following the last address associated with the new data. In the case of a buffer 136 reaching capacity, data can be wrapped around, written starting from the first address of the buffer. The second pointer can be a read pointer that indicates the initial address where data was most recently written. Thus, data between the read pointer and the write pointer can represent the most current data. Additional details regarding the operation of example buffers 136 are described in more detail below with respect FIG. 2.

When a program 138 wants to write text to terminal output, the program 138 can call one or more debug subroutines of a debug library 139 stored in the memory 132. The debug library 139 can be a code module, component, or the like, which is statically linked or dynamically linked to the program 138. The debug subroutine(s) can operate to store the text in one of the buffers 136. An example of a debug library 139 with various debug subroutines is set forth in the Example Code section below. The debug subroutine may make one or more calls to a memory copy function to copy the text to the buffer 136. An example memory copy function is the memcpy function available in the C programming language. Subsequently, the debug subroutine(s) can update the write pointer (or write offset) associated with the debug buffer 136. This write operation can be performed very quickly and does not block the target CPU in certain embodiments. The debug probe 120 can periodically read the write pointer and read the memory that has been written into the buffer 136, thereby receiving the text written by the program 138. The debug probe 120 can then update the read pointer to indicate that the text has been read, enabling the debug probe 120 to read starting from the appropriate address next time that data is inserted into the buffer 136.

Thus, the target system 130 can write to a debug buffer 136, and the host system 110 can read the debug buffer 136 through the debug probe 120. In an embodiment, the debug probe 120 is either a smart probe (e.g., with a CPU) or a dumb probe (e.g., without a CPU). A smart probe can read the debug buffer 136 without first being instructed by the host system 110 to do so in some embodiments.

The target system 130 can operate via a debug interface (not shown), which can allow the program 138 running on the target system 130 to read from and write to the target system's 130 memory 132 without stopping the CPU 134. Most modern architectures of CPUs used in microcontrollers include debug interfaces that allow doing so. The debug interface can be a hardware interface in one embodiment, which may include one or more pins dedicated to debugging operations. Examples of popular modern microcontroller CPUs with this feature include CPUs based on ARM™ Cortex-M™ technology (e.g., Cortex-M0,1, 3, 4) as well as the Renesas™ RX CPU, although many other types of microcontrollers may implement the features described herein.

If the target system 130 includes multiple CPUs 134 or CPU cores, each CPU/core can have access to each buffer 136, or each CPU 134 or core may have access to a dedicated buffer 136 available for write access solely by that CPU 134 or core. Thus, multiple buffers 136 may be available for multiple cores.

In addition, multiple buffers 136 may be provided for other reasons. In one situation, two buffers 136 are provided; one buffer 136 being for the target system 130 to send messages to the host system 110, and the other buffer being for the host system 110 (or debug probe 120) to send input or messages to the target system 130. In another scenario, multiple buffers are provided to segregate different types of data, such as text data and serial or binary data, into different buffers. Each buffer 136 (or a set of buffers 136) in such a scenario can be considered a channel. Channel embodiments are described in greater detail below with respect to FIG. 7.

There may be several advantages of using the one or more debug buffers 136 in some embodiments. Debug buggers 136 can be written to and read much faster than prior terminal output methods. For instance, speeds of about 10-10000 times faster may be achieved than current solutions, allowing real time (or near real time), non-intrusive output reads about 1 μs (microsecond) for 80 bytes on a 168 MHz Cortex-M™ microcontroller unit (MCU), in comparison to about 100 μs for SWO (assuming 10 MHz SWO speed) and in comparison to about 10000 μs for semihosting/breakpoint. Thus, the write performance can be truly real-time or near-real-time, whereas the other options cannot be used in time-critical embedded systems. Further, no breakpoint or additional hardware pin is needed to implement the one or more debug buffers 136 in certain embodiments.

Figure 2:
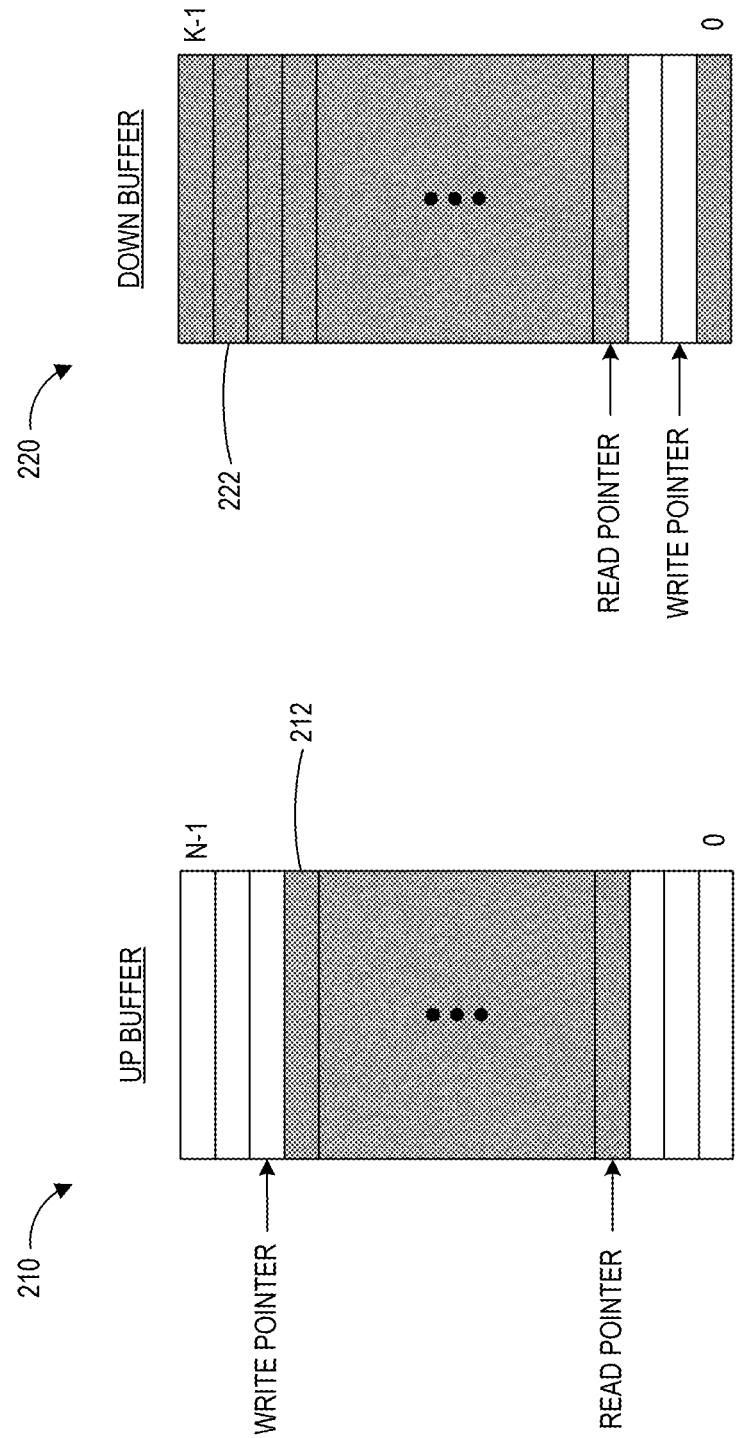
FIG. 2 depict example cyclic buffers that can be used in embedded system debugging.

FIG. 2 depicts example debug buffers 210, 220 shown schematically. These buffers 210, 220 are more detailed examples of the debug buffer(s) 136 of FIG. 1. The buffers 210, 220 shown include an up buffer 210 and a down buffer 220. The up buffer 210 can be written to by the host system 110 (or debug probe 120) and can be read by the target system 130. The down buffer 220 can be written to by the target system 130 and read by the host system 110 and/or debug probe 120. Either one of the buffers 210, 220 is optional in some embodiments.

Each buffer 210, 220 is shown schematically as having N (up buffer) or K (down buffer) memory locations 212 or 222, where N & K are integers, and where N need not be equal to K. Write and read pointers point to different memory locations 212, 222, representing the write and read pointers described above. Each memory location 212, 222 can represent one or more data words, one or more bytes, one or more bits, or some other unit of memory. Data stored in each buffer 210, 220 is represented by shading, with the up buffer 210 showing data between the read pointer and the write pointer, and the down buffer 220 showing data between the read pointer and wrapping around to the write pointer near the start of the buffer. The data stored in the buffer 220 therefore illustrates the circular nature of the buffer, with data wrapped around from the end (address K−1) to the beginning (address 0).

The write pointer can point to the location in the target's memory where the next data unit (e.g., byte, word, bits etc.) transmitted will be written to. The same way, the read pointer can point to the location in memory from which the next data unit is to be read. When a data unit is written to the buffer 210, 220, the write pointer can be incremented. When the write pointer reaches the end of the buffer 210, 220, it can wrap over to the start of the buffer 210, 220. The same procedure can be used by the read pointer. To speed up the operation, multiple data units can be read or written at the same time before the write or read pointer is adjusted.

The following example uses a byte as an example of a data unit. The number of bytes in the buffer 210 or 220 can be computed from the difference in address values (or counter values) between the write and read pointers. In one embodiment, the number of bytes is computed as follows:

$$\text{NumBytesInBuffer} = (p\text{Write} - p\text{Read} + \text{BufferSize}) \% \text{BufferSize} \quad (1)$$

(where pWrite and pRead are write and read pointers, respectively), and where % represents a modulo operation.

The following examples use equation (1) to compute the number of bytes of data in a buffer 210 or 220 having a size of 100 bytes:

(Example 1) BufferSize=100, pWrite=0, pRead=0=>0 bytes in buffer
(Example 2) BufferSize=100, pWrite=10, pRead=0=>10 bytes in buffer
(Example 3) BufferSize=100, pWrite=10, pRead=90=>20 bytes in buffer
(Example 4) BufferSize=100, pWrite=20, pRead=90=>30 bytes in buffer
(Example 5) BufferSize=100, pWrite=20, pRead=20=>0 bytes in buffer
(Example 6) BufferSize=100, pWrite=20, pRead=21=>99 bytes in buffer (Full)

Since the example buffers 210, 220 in FIG. 2 use two pointers, concurrent read and write access to each buffer 210, 220 can be achieved. However, as illustrated by Example 6 above, the last byte in the buffer may not be used with this type of implementation. Otherwise, there would not be a way to distinguish between a full or empty buffer. If this is considered a problem, one solution is to make the buffer one byte larger to compensate for the lost byte. Other example solutions, any combination of which may be used with the features described herein, are described below under the section entitled "Example Circular Buffer Implementations."

The dual buffer approach shown in FIG. 2 can also be considered to be bidirectional because one buffer can be used to communicate from the target to the host while the other buffer can be used to communicate from host to the target. In other embodiments, a single buffer can be used bidirectionally with four pointers and more complex read/write logic. In another embodiment, the buffer for the host sending to the target can be a small buffer, such as one byte or a few bytes (or more), along with a full or empty flag for marking the buffer as being written to or read from instead of using read/write pointers. Initially the buffer may be empty, and once the host writes into it the host (or debug probe) sets the flag to full. When the target reads the buffer, the target can clear the flag, setting it to empty again. The same scenario can be used for the buffer from target to host, except that one (or a few) bytes may not be enough for target-to-host messages. Even with a larger buffer, this scheme is doable but may impact real-time execution of the real-time program (138) because this type of buffer typically allows one message at a time. Since the overhead for two pointers of the CPU is typically not high, the two-pointer buffer can be more effective for communicating from target to host than the full/empty flag scenario. In one embodiment, the target system can include multiple different buffers that are implemented in different ways, including one or more buffers that operate using read/write pointers, one or more buffers that operate using flags, one a more buffers that operate with one or more counters, and so forth.

In some embodiments, more than a single message may be written to a buffer 210 or 220 before the message(s) are read. Thus, each buffer 210, 220 can include as many messages as are allowed by their size. If the buffer 210 or 220 reaches capacity, either the buffer can be overwritten or the target CPU can be halted until the buffer is emptied in whole or in part. Halting the target CPU is not desirable in some situations and may be prevented at least partially by increasing the size of one or both buffers 210, 220.

Another solution to this problem is for the debug probe 120 to autonomously poll the down buffer 220 (for writing from target to host) instead of waiting for the host system 110 to instruct the debug probe 120 to do so. In some implementations, the debug probe 120 can read the down buffer 220 as fast as once every 10 ms or faster, whereas the host system 110 may send an instruction to read the down buffer 220 about 50-100 times per second. Thus, autonomously polling the down buffer 220 with the debug probe 120 can be significantly faster than relying on the host system 110 to do so, which can also allow a smaller down buffer 220 to be created. With autonomous polling by the debug probe 120, the buffer 220 may be emptied fast enough to allow for a lower buffer size since it may reach capacity less often. Additional options for addressing buffer full conditions are described below with respect to FIG. 3 and FIGS. 9 and 10.

III. Example Terminal Output and Input Processes

Figure 3:
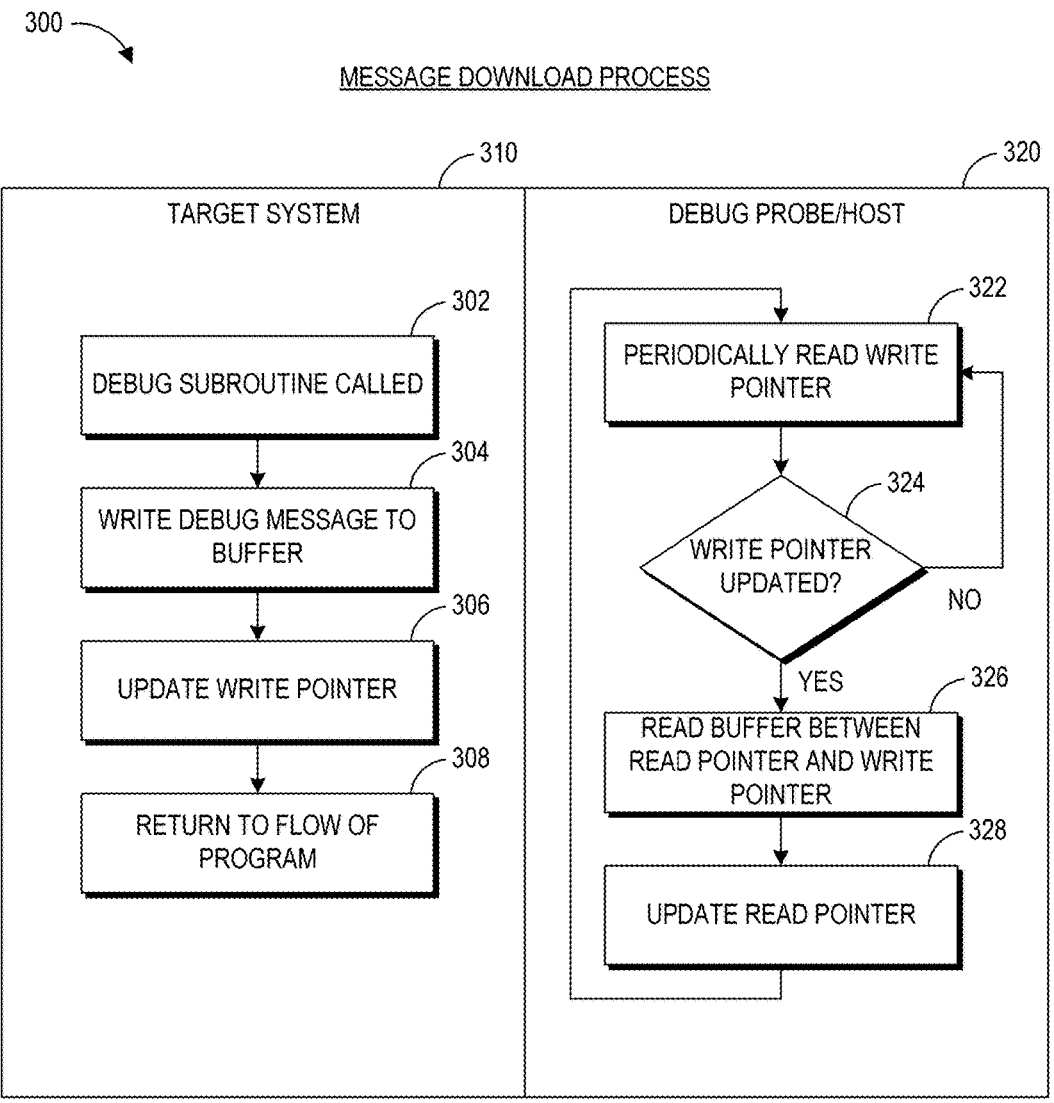
FIG. 3 depicts an example message download process.

FIG. 3 depicts an example message download process 300 including separate subprocesses 310, 320 from separate points of view of a target system and a debug probe (respectively). For example, the subprocess 310 may be implemented by the target system 130, and the subprocess 320 may be implemented by the debug probe 120 of FIG. 1. The separate subprocesses 310, 320 can be implemented independently of one another, in parallel or at the same time or approximately the same time, or the like. Although the process 300 is described in the context of the system 100 of FIG. 1, the process 300 may be implemented by any of the systems described herein (see, e.g., FIGS. 6A and 6B), as well as by other computing systems.

With respect to the subprocess 310, at block 302, a real-time program 138 of the target system calls one or more debug subroutines of a debug library 139. For instance, the target system can make this call in response to some error or debug condition being detected or simply to output a status message (such as "Booting" or "Firmware version 1.23, compile Dec-24-2014" or some other message). Other examples of messages at the target system may send include "cannot open storage device," "overtemperature on motor," "supply voltage too high," "file not found," "file system corrupt," "booting," rebooting," "operation completed successfully," "self-test failed," and so on. In response to the debug subroutine(s) being called, at block 304, the debug subroutine(s) of the target system 130 can write a debug message to the down buffer 220. Subsequently, at block 306, the target system 130 can update the write pointer commensurately with the amount of data written to the buffer. Thereafter, the debug subroutine of the target system returns to the flow of the real-time program 308.

Independent of the target system 130, the debug probe 120 can periodically read the write pointer in the down buffer at block 322 of the subprocess 320. As indicated in FIG. 3, if the write pointer has changed (block 324), the debug probe can read the buffer (block 326) between the read pointer and the write pointer to obtain a debug message or other data provided by the target system with respect to the subprocess 310. Thereafter, at block 328, the debug probe can update the read pointer to reflect that the data has been read. As described above, counters may be used instead of pointers to mark buffers as being read or written to. More generally, the debug probe or host may be considered to mark the buffer as being read or being written to.

The debug probe does not need to poll the target system as fast as the target system can write to the buffer in some embodiments. As long as the debug probe polls the buffer often enough to avoid the buffer becoming full, the debug probe need not poll faster. If the buffer becomes full, the target system can either not write an intended message to the buffer (skipping the message), halt operation of the real-time program until the buffer has room again, or overwrite the buffer. None of these outcomes may be desirable, depending on the implementation. However, in many situations, the target system writes to the buffer infrequently. For instance, the target system may write 1-3 messages in rapid succession but then wait a relatively long period of time before writing another message to the buffer. Accordingly, the debug probe can still poll the buffer on the order of milliseconds while the target system writes to the buffer on the order of about 1 µs or so.

As described above, there may be two ways how the periodic check of the write pointer may be accomplished (block 322). The check by the debug probe may be initiated by the host system, which can be straightforward but slow. If the debug probe has its own CPU, the check by the debug probe can be an autonomous mode (autonomous from the host). In this mode, the debug probe checks the buffer and write pointer periodically without instruction from the host and transfers the data into a buffer inside the debug probe, where it remains until requested by the host. This approach can be more efficient, the target may use a smaller buffer, and chances of a "buffer full" condition being reached on the target system can be reduced.

However, if the buffer does become full, the target system can instead enlarge the buffer dynamically in one embodiment. Alternatively, the developer can change the buffer size manually and recompile or choose a faster debug probe with a higher reading speed. The target system can also send shorter messages to attempt to preempt filling the buffer to capacity.

As described above, the described pointers can be replaced with counters, flags, or other circular buffer implementation details, without departing from the other functionality of the process 300. Likewise, pointers described in subsequent processes may also be replaced with counters, flags, or other circular buffer implementation details.

Figure 4:
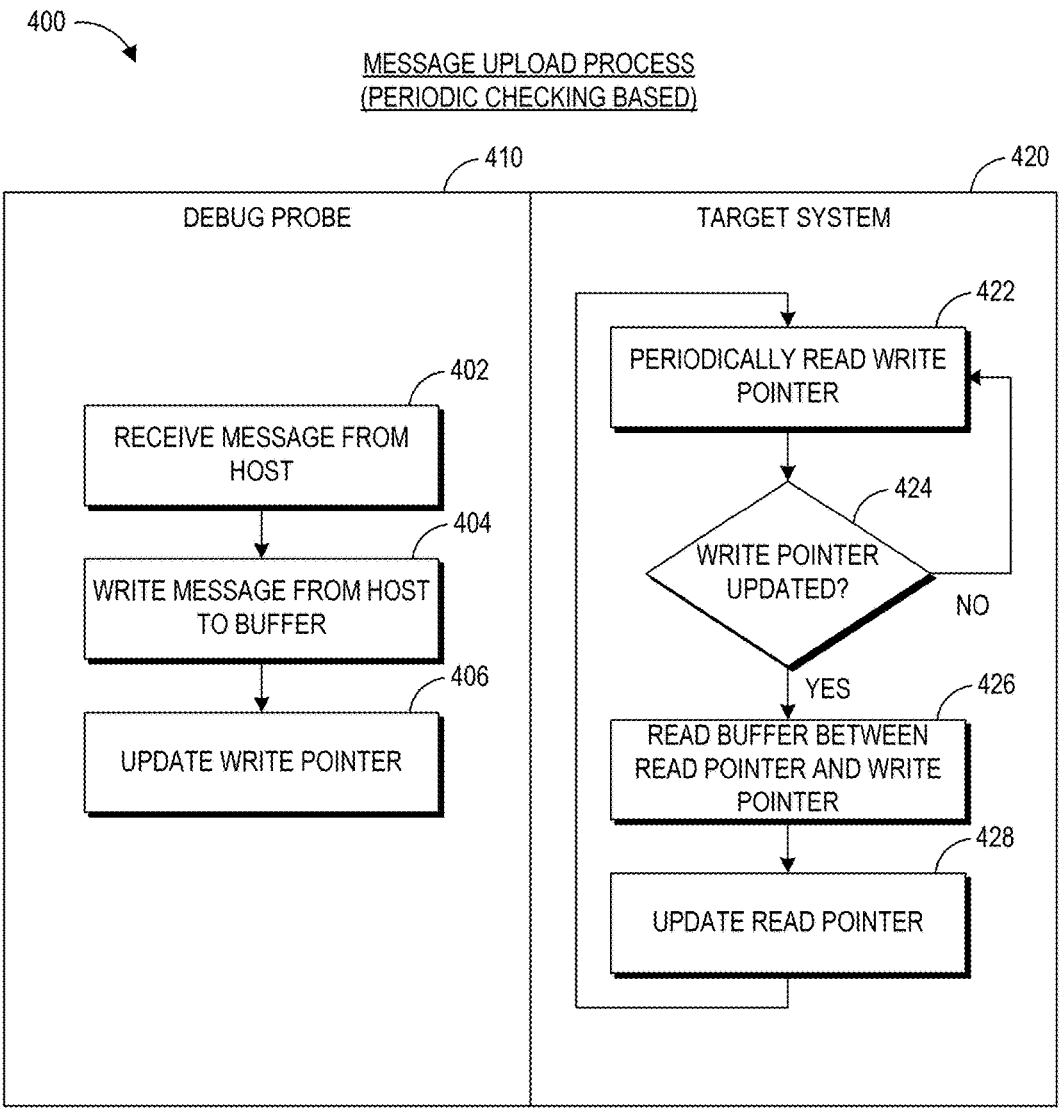
FIG. 4 depicts an example message upload process (periodic checking based).

Referring to FIG. 4, an example message upload process 400 is shown. The upload process 400 includes separate subprocesses 410, 420 from separate points of view of a debug probe and a target system (respectively). For example, the subprocess 410 may be implemented by the debug probe 120 and the subprocess 420 may be implemented by the target system 130. The separate subprocesses 410, 420 can be implemented independently of one another, in parallel or at the same time or approximately the same time, or the like. Although the process 400 is described in the context of the system 100 of FIG. 1, the process 400 may also be implemented by any of the systems described herein (see, e.g., FIGS. 6A and 6B), as well as by other computing systems.

In the subprocess 410, the debug probe receives a message from the host at block 402, writes the message to a buffer in the target system at block 404, and updates a write pointer for that buffer 406. The target system periodically checks the write pointer at block 422 to see if it has been updated (block 424), and if so, reads the buffer between the read and write pointers at block 426. Thereafter, the target system updates the read pointer at block 428. Examples of messages that the host system might send to the target system include instructions for booting an image or loading a file. Other example host-to-target messages are described below with respect to FIG. 7.

Figure 5:
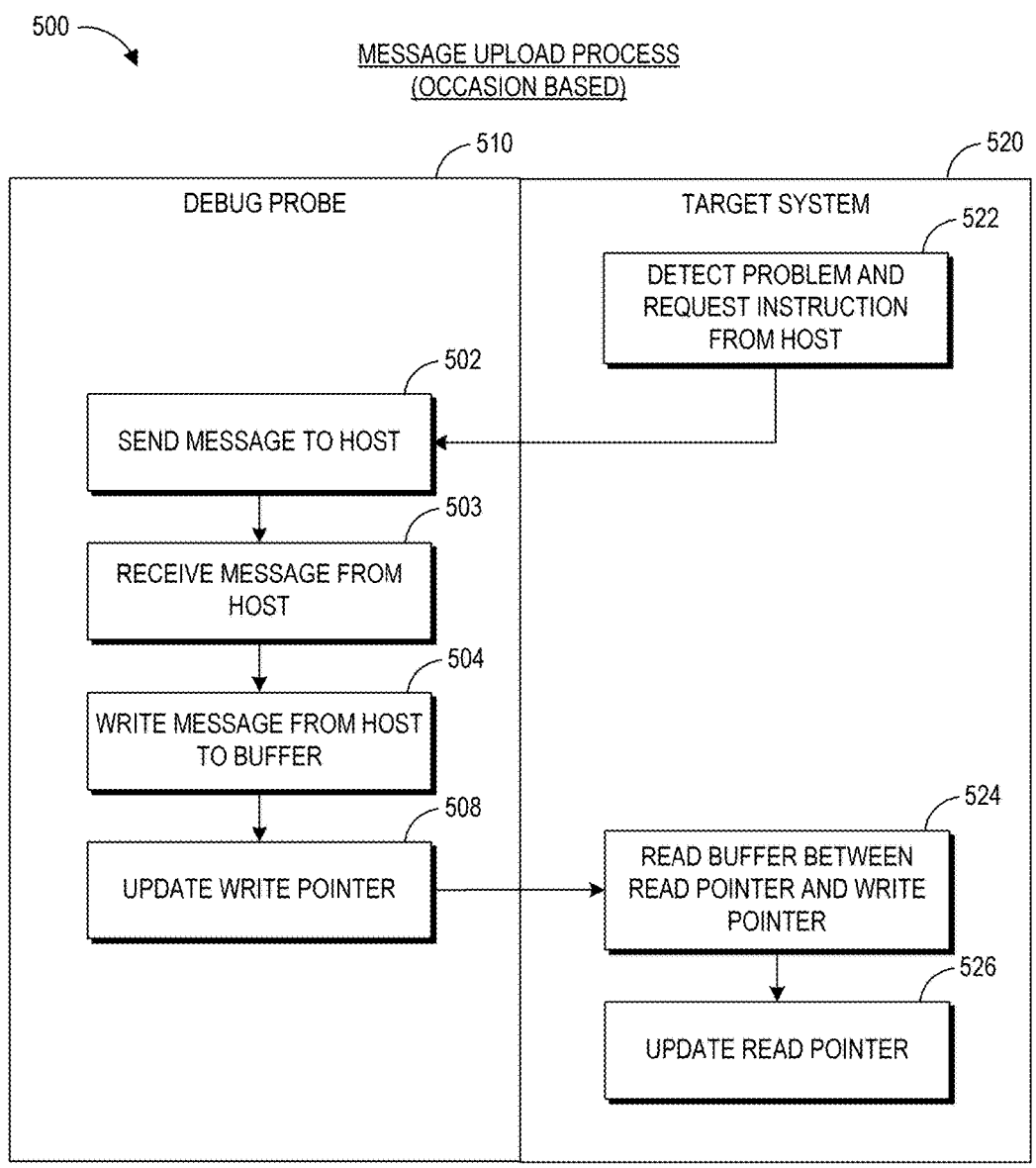
FIG. 5 depicts an example message upload process (occasion based).

FIG. 5 depicts a process 500 that is an example alternative approach to the process 400 shown in FIG. 4. Like the process 400, the process 500 includes separate subprocesses 510, 520 from separate points of view of a debug probe and a target system (respectively). For example, the subprocess 510 may be implemented by the debug probe 120, and the subprocess 520 may be implemented by the target system 130. The separate subprocesses 510, 520 can be implemented independently of one another, at least partially in parallel, or the like. Although the process 500 is described in the context of the system 100 of FIG. 1, the process 500 may also be implemented by any of the systems described herein (see, e.g., FIGS. 6A and 6B), as well as by other computing systems.

In FIG. 5, the target system does not periodically poll for updates to the upload buffer. Rather the target system checks the buffer based on specific occasions. For instance, in the depicted embodiment, the target system can detect some problem (such as system shutdown or some other failure) at block 522 and request an instruction from the host (such as "want to reformat drive?"). The problem may be a problem with a running program of some hardware of the target system. The instruction requested of the host can be inserted into the debug buffer for reading by the host or through some other communications channel or mechanism, including mechanisms that do not involve debug buffers, such as the semi-hosting or SWO mechanisms described above.

The debug probe can relay this message to the host at block 502 and receive a corresponding message in return at block 503. The debug probe can write this message from the host to the buffer at block 504 and update the write pointer at block 508. Meanwhile, the target system can be polling the buffer (not shown) to check for an update to the write pointer and can read the buffer once the write pointer is updated. This polling can take place from any routine in the target system, including an interrupt service routine that already is triggering many times per second. Thereafter, the target system can read the buffer between the read pointer and the write pointer at block 524 and update the read pointer at block 526.

Figure 7:
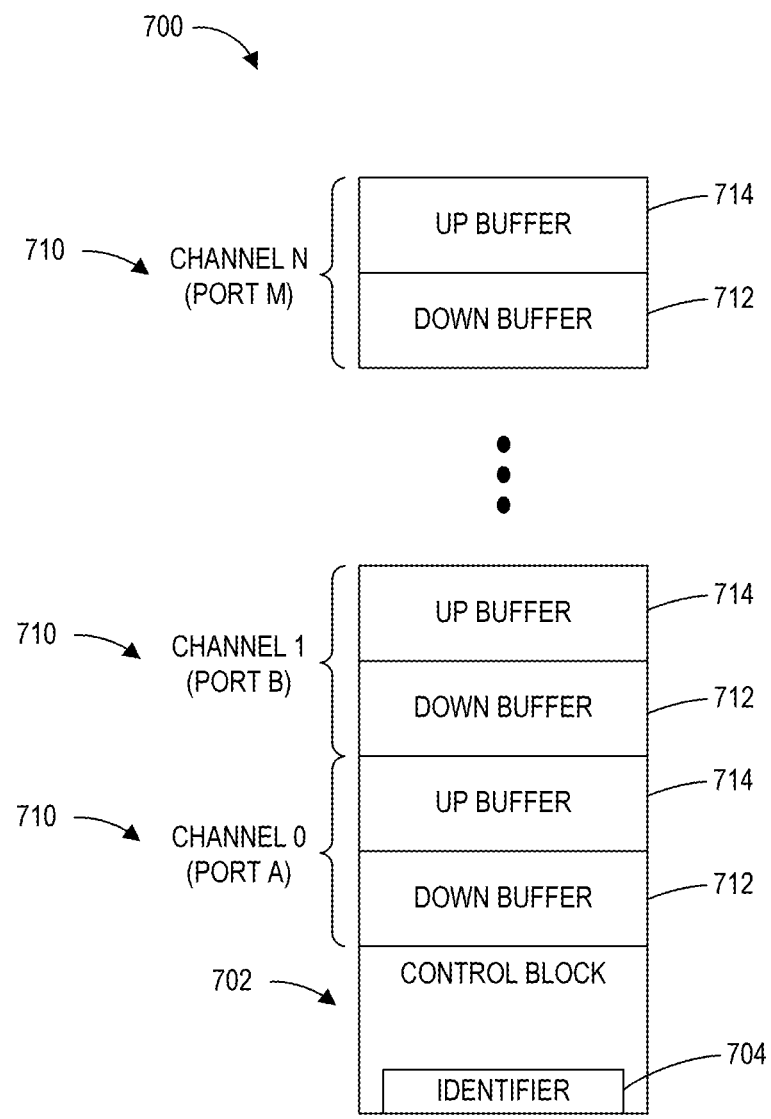
FIG. 7 depicts an embodiment of a multi-channel debug buffer configuration.

Any of the preceding processes, as well as other processes described herein, can be used to output or input messages other than debug messages (see, e.g., FIG. 7).

IV. Remote Debugging Embodiments

Figure 6A:
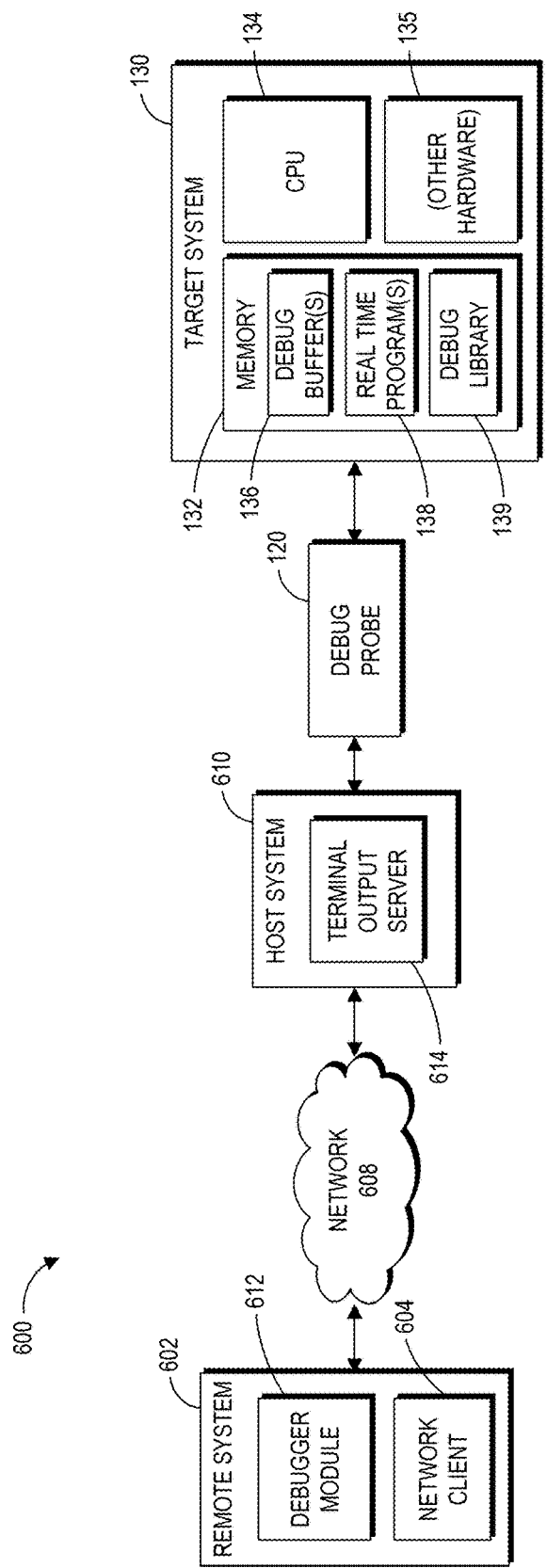
FIGS. 6A and 6B depict embodiments of computing environments for remotely communicating with an embedded system.
Figure 6B:
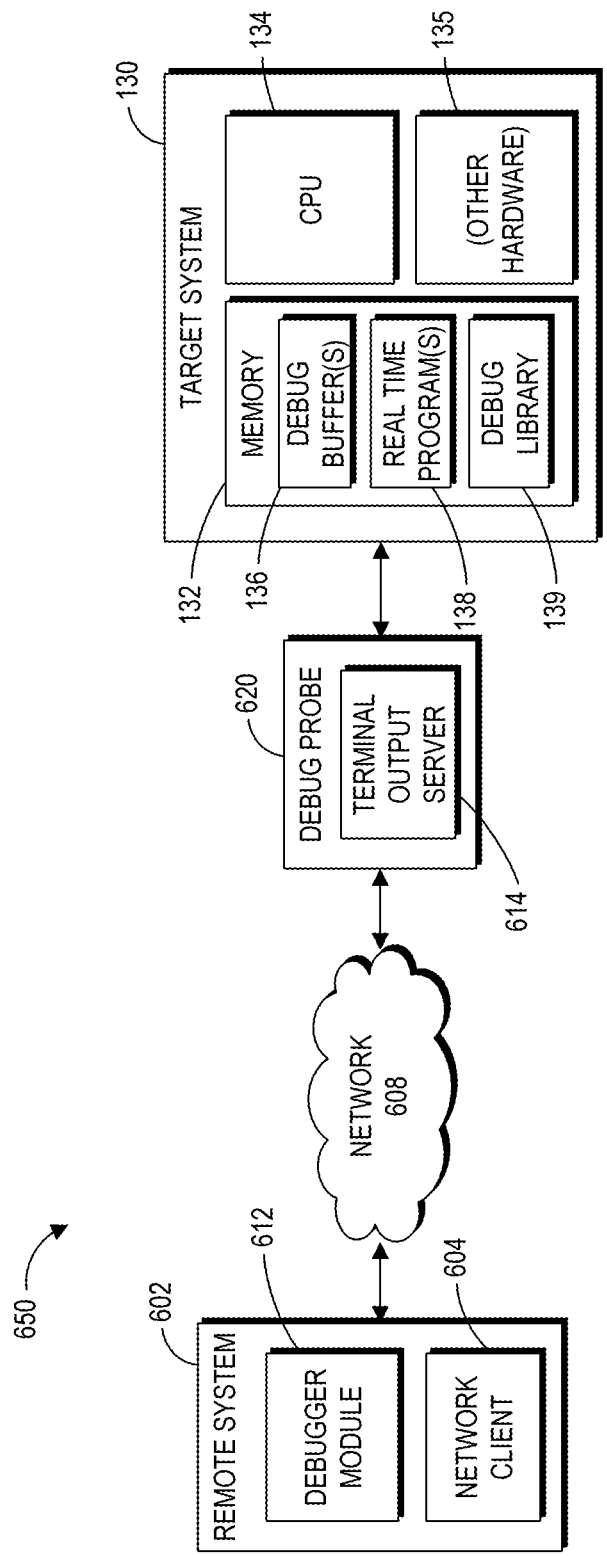

FIGS. 6A and 6B depict embodiments of computing environments 600, 650 for remotely communicating with an embedded system. The computing environments or systems 600, 650 include many of the components of the computing environment or system 100 and may implement some or all of the many features described herein with respect to other FIGURES. In addition, the computing environments 600, 650 allow a remote system 602 having a network client 604 to communicate with the target system 130 over a network 608, which may be a local area network (LAN), a wide area network (WAN), the Internet, a virtual private network (VPN), combinations of the same, or the like.

The remote system 602 can be any computing device, such as a desktop, laptop, tablet, smartphone, cell phone, or the like. The remote system 602 is depicted having a debugger module 612, which may have all the functionality of the debugger module 112 described above. The user of the remote system 602 can use the debugger module 612 to debug the real-time program(s) 138 in the target system 130. The network client 604 shown in the remote system 602 can be a Telnet client operating the Telnet protocol, a Secure Shell (SSH) client operating a cryptographic network protocol, or some other client using any protocol suitable for communicating with the target embedded system. In an embodiment, the protocol used by the network client 604 uses a Transmission Control Protocol/Internet Protocol (TCP/IP) stack or set of protocols for communicating over the network 608. The remote system 602 can access the target system 130 for field service in a production environment as well as in a test or development environment.

A user of the remote system 602 can use the network client 604 to obtain information about the target system 130, remotely debug the target system 130, or remotely program the target system 130. The difference between the way this communication is conducted in FIGS. 6A and 6B is that in FIG. 6A, the remote system 602 interacts with a host system 610 over the network 608, and in FIG. 6B, the remote system 602 communicates directly with a debug probe 620. The host system 610 and the debug probe 620 can have all the functionality of the host system 110 and the debug probe 120, respectively. In addition, the host system 610 is shown having a terminal output server 614 in FIG. 6A, which alternatively may be located in the debug probe 620 of FIG. 6B. The terminal output server 614 can implement at least a portion of the TCP/IP stack to enable the remote system 602 to communicate with either the host system 610 (FIG. 6A) or the debug probe 620 (FIG. 6B) over the network 608.

The terminal output server 614 can assign one or more TCP port numbers to correspond to the one or more debug buffers 136. The port number(s) may be selected from a high end of the available 64K port range (such as a 5-digit number) to avoid conflicts with well-established port numbers. (In other embodiments, any available port number may be selected.) By assigning a port to each debug buffer 136, the terminal output server 614 enables the remote system 602 to directly access the debug buffer(s) 136 remotely via the network client 604. Thus, the remote system 602 can communicate with the target by sending messages to and/or receiving messages from the target system 130 without having to do so through a host system. Bypassing the debugger module 112 for these communications can be advantageous because the debug module 112 may not be natively enabled for reading or writing to the debug buffer(s) 136 or for enabling remote access for doing so.

Some examples of commands that a user may wish to use remotely include commands that show available space in memory or on disk to troubleshoot why the target appears to be out of memory or disk space (e.g., "df" in some systems), commands that show registered Ethernet addresses (e.g., "arp -a" in some systems), commands that show a list of processes (such as the "task" command in some systems), commands that indicate whether the system is responding over the network (such as a "ping" command), directory information commands (such as "dir" or "ls"), or any other command that provides diagnostic information about the target system. Additional example commands that may be sent remotely are described below with respect FIGS. 9 and 10.

In yet another embodiment (not shown), the terminal output server 614 may be a program running in the memory 132 of the target system 130, enabling the remote system 602 to communicate directly with the target system 130 over the network.

V. Multichannel Debugging Embodiments

FIG. 7 depicts an embodiment of a multi-channel debug buffer configuration 700. The multi-channel debug buffer configuration 700 illustrates an example scenario where more than two debug buffers may be used by the target system for communications to and/or from a host (or debug probe). The debug buffers shown include down buffers 712 and up buffers 714, which can have all of the functionality of the other buffers described herein, including the down and up buffers 220, 210 of FIG. 2. Pairs of down and up buffers 712, 714 are grouped into channels 710. Each channel 710 can be used to communicate a different type of data to the host system or from the host system to the target. For convenience, the buffers 712, 714 of the various channels 710 are shown allocated contiguously in a memory structure. However, contiguous allocation is not necessary in some embodiments. Further, in other embodiments, each channel may have more than one down or up buffer for a total of more than two buffers, or each channel may have one buffer instead of two buffers.

Some examples of different types of data that may be communicated in different channels include textual or string data and binary data. Several examples of textual or string data are described above and also below. Binary data can include data obtained from a serial device, such as a Universal Asynchronous Receiver/Transmitter or UART. Many target systems include UARTS for communicating serial data to and from a host system. Typically, communications from a UART are provided on one or more dedicated serial wires or lines. However, if the binary data from a UART is instead accessed by the real-time program 138 (see FIG. 1) and stored in a debug buffer 714 of a specific binary channel 710, the host or debug probe can access this data without communicating on a separate line or set of lines. In fact, this channel ability can replace the need for a UART to communicate binary or serial data entirely.

In addition to channels for text and binary data, channels may be provided for any other type of data relevant to a target system or host system. Thus, for example, a channel may be provided for reporting voltage values, sensor values, or any other values measured or otherwise obtained by the target system. For instance, if the target system is implemented in a CNC machine, which operates using X-Y coordinates to manufacture articles, a channel could be provided for reporting X-Y coordinates. More generally, channels may be provided for reporting information about any aspect of the target system, whether it be related to hardware or software, such as the status of a blinking light, a momentary switch, or any other input or output.

Further, the host (or remote system 602) may also send data other than text to the target, including binary data and commands (which may be textual, binary, or numeric, etc.). For instance, a host may send a command to a target system requesting that a sensor be polled to obtain data from the sensor at a given time. This command may be stored in a buffer of a channel dedicated for commands. Additional examples of the host (or remote system 602) sending commands to the target system are described below with respect to FIGS. 9 and 10.

In an embodiment, the target system can access a subroutine of the debug buffer library 139 (see FIG. 1) to create one or more channels having one or more debug buffers dynamically, at runtime. The target system may also access a subroutine of the debug buffer library 139 to dynamically adjust the size of one or more buffers at runtime. Adjusting the number or size of the buffers provides flexibility so that the target system does not need to know at compile time what type of debug resources are needed in some embodiments. Thus, the target system need not allocate too many or too large of debug buffers at compile time, thereby wasting memory, or too few or too small debug buffers at compile time, which may provide insufficient debugging resources. In another embodiment, each channel 700 can be assigned a separate port in the terminal output server 614 described above with respect to FIGS. 6A and 6B.

An example control block 702 is also shown in FIG. 7. This control block 702 will be referred to in the context of the process 800 of FIG. 8, described below.

VI. Example Debug Buffer Identification Process

Figure 8:
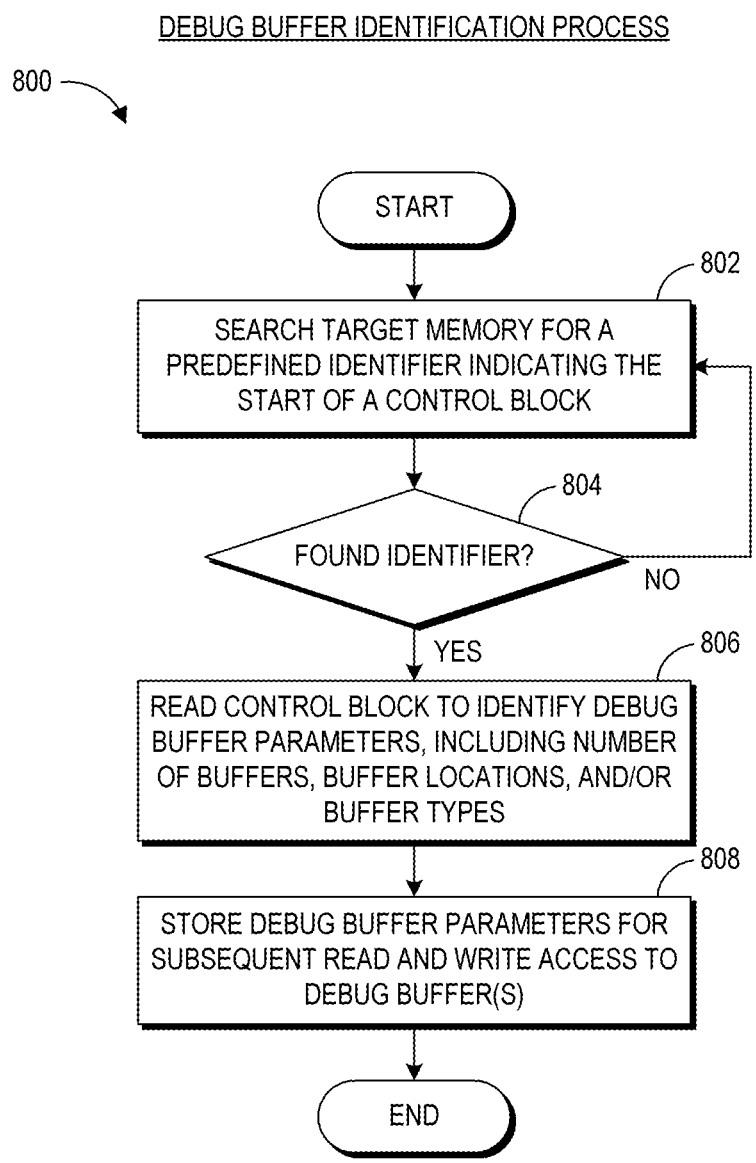
FIG. 8 depicts an example debug buffer identification process.

FIG. 8 depicts an example debug buffer identification process 800, which can enable a debug buffer to identify the location of one or more debug buffers in a memory of the target system. For convenience, the process 800 is described in the context of the system 100 of FIG. 1. However, the process 800 may also be implemented by any of the systems described herein (see, e.g., FIGS. 6A and 6B), as well as by other computing systems.

As described elsewhere herein, the debug module 112 in the host 110 may not be natively compatible with accessing the debug buffers 136 in the target system 130 (see FIG. 1). Without some modification to the code of the debug module 112, it would be difficult or impossible for the debug module 112 to know where to access the debug buffer(s) in the memory 132 of the target system 130. Thus, the debug probe 120 can be configured with software or firmware that implements a process such as the process 800 to identify the location(s) of the debug buffer(s) 136 at runtime.

At block 802, the debug probe searches the target system's memory for a predefined identifier indicating the start of a control block. An example of such a control block is shown in FIG. 7 as the control block 702. An identifier 704 is stored in the control block and may be the first byte or data word in the control block 704 (but need not be in other embodiments).

At block 804, if the debug probe has not yet found the identifier, the debug probe continues to search at block 802. Once the debug probe has found the identifier, the debug probe can read the control block to identify debug buffer parameters at block 806. These parameters can include the number of buffers in the target's memory, the buffer address locations, buffer sizes, and/or buffer types, as well as channel configuration information (see FIG. 7). At block 808, the debug probe can optionally store the debug buffer parameters in a memory of the debug probe to enable subsequent read and write access to the debug buffer(s).

As a result of this automatic mode of detecting locations of the buffers, in certain embodiments the debug probe can communicate between the host and the target without the debugging module 112 having to know how to find the buffers in the target's memory. Moreover, this automatic mode feature can also facilitate communicating with the target system without a debugging module 112 (e.g., as in the remote communication scenario of FIG. 6B).

The debug probe or the debugger module may find the control block or identifier of the control block in other ways than shown in FIG. 8. For instance, in another embodiment, the debug probe or debugger module can access an object file associated with the real-time program that calls the debug library. The debug probe or debugger module can find the identifier or the control block in the object file. An example of such an object file is any file that complies with the Executable and Linkable Format (ELF) standard.

VII. Example User Interfaces

Figure 9:
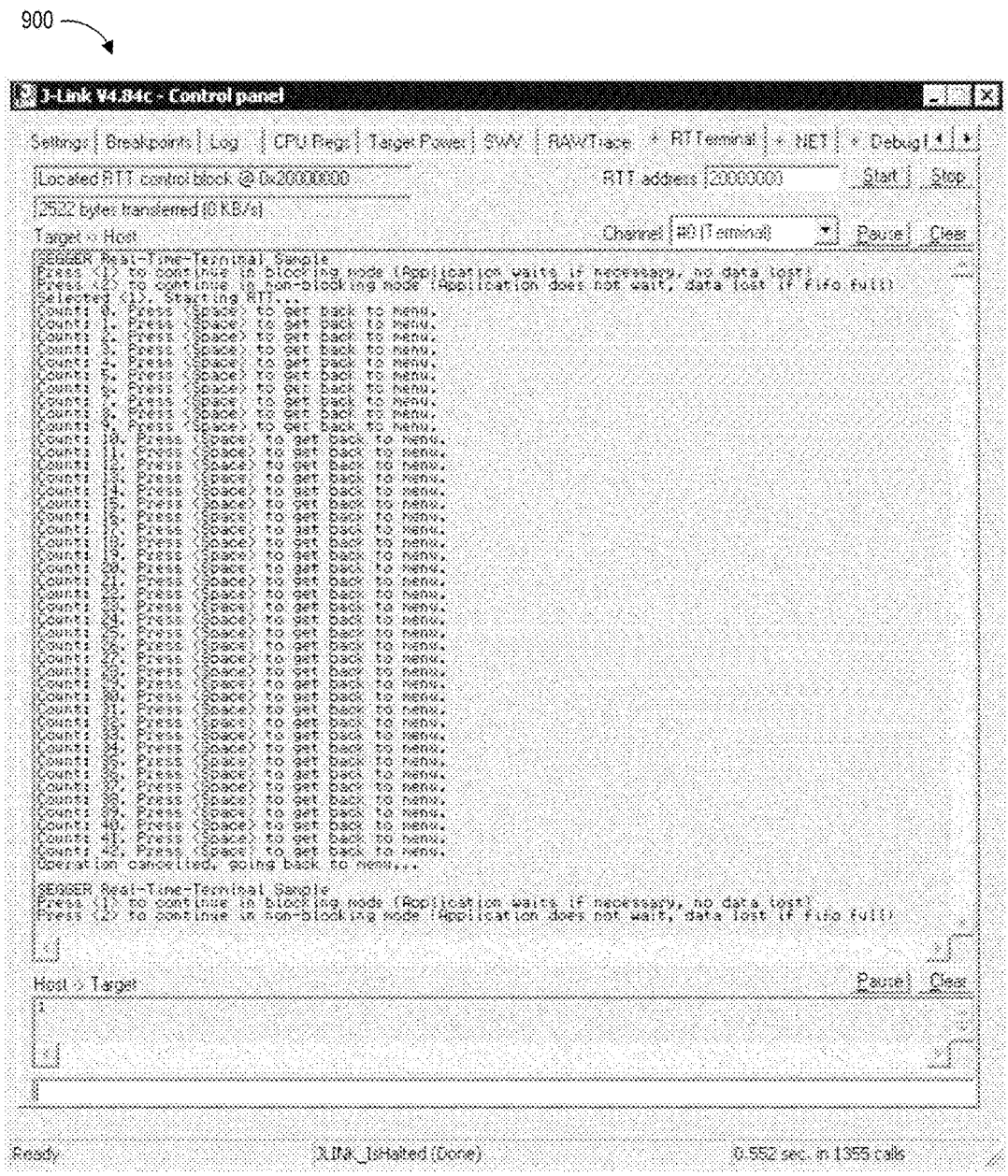
Figure 10:
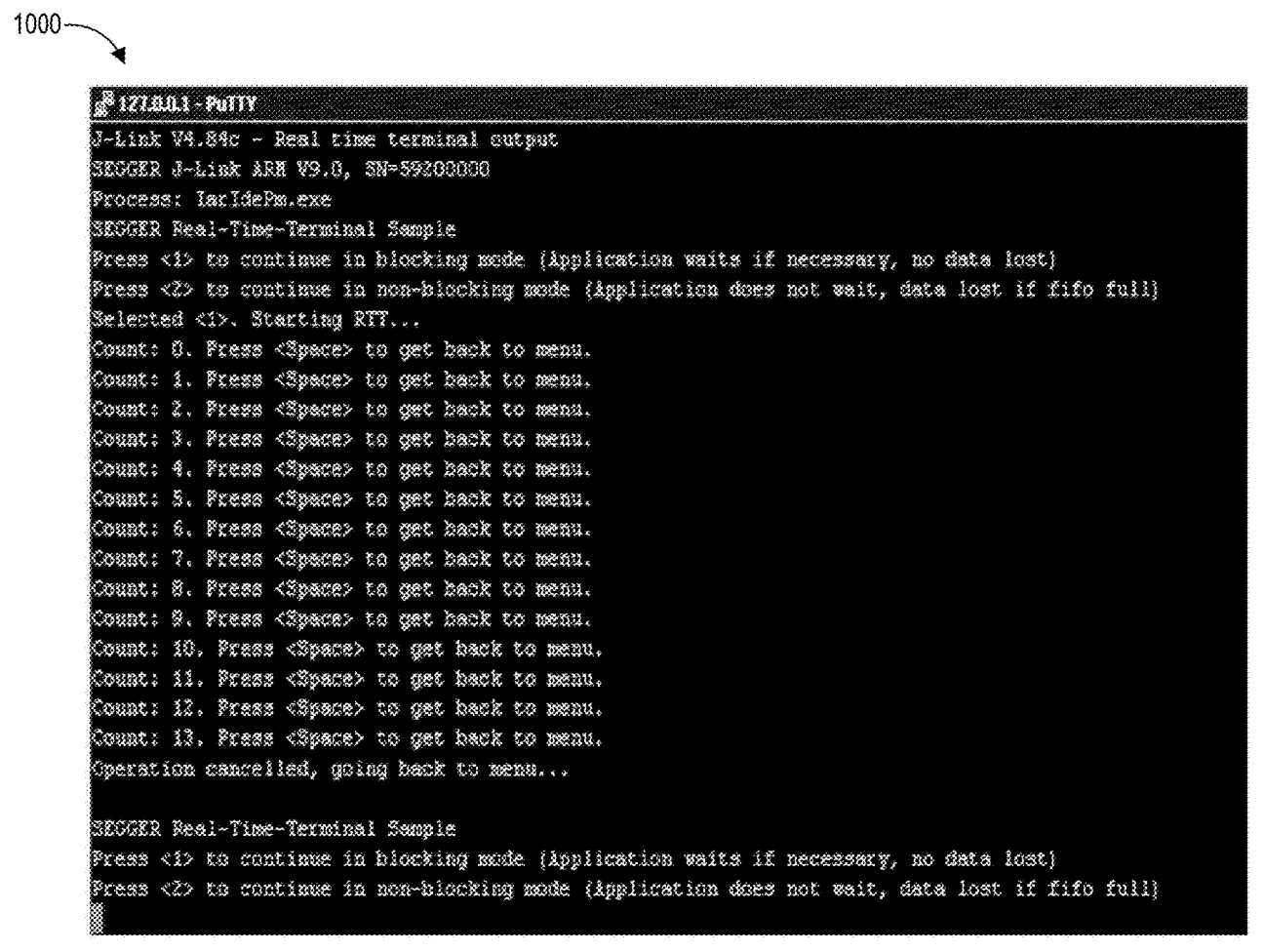

FIGS. 9 and 10 depict example user interfaces 900, 1000 for communicating with a target system, such as any of the target systems described above. The user interfaces 900, 1000 may be output by any of the host systems described above or any of the remote systems (see FIGS. 6A, 6B) described above. The user interface 900 is a graphical user interface (GUI), while the user interface 1000 is a command-line interface.

In each of the user interfaces 900, 1000 shown, the user has sent a command to a target system to set a mode of operation of the debug buffer(s). These modes include blocking and non-blocking. A blocking mode of operation can refer to the target system waiting or stopping execution of instructions in the CPU if the buffer is full. Thus, until the buffer(s) are read, the CPU may not process further program instructions. In the non-blocking mode, the program of the target system overwrites the buffer if the buffer is full, and data may therefore be lost. An advantage of the blocking mode is the data may not be lost, while an advantage of the non-blocking mode may be that the program may not be halted or significantly slowed when the buffer is full. A user may choose blocking mode or non-blocking mode depending on the type of program or type of target system or based on other considerations.

VIII. Example Data Visualization System

In addition or in alternative to the user interfaces 900, 1000, a data visualization system 1110 (shown in FIG. 11) can be provided to facilitate the debugging process. The data visualization system 1110 may be a part of the host system (see, e.g., host systems 110, 610) and/or a part of the remote system (e.g., remote system 602). For instance, the data visualization system 1110 may include hardware and/or software components, such as specialized computer instructions stored in memory that execute in a hardware processor of the host system 110.

The data visualization system 1110 may analyze and visualize data obtained from the target system 130, for example, in the debugging process. For example, the data visualization system 1110 can analyze which interrupts, tasks and software timers have executed, how often, when executed (e.g., by timestamp or CPU cycle), and how much time they have used. Where the host system allows cycle accurate profiling and/or can time user functionality, the data visualization system 1110 can also provide visualization of these analyses. Advantageously, in certain embodiments, the data visualization system 1110 can shed light on what processor events happened in which order, which interrupt has triggered a task switch, and which interrupt or task has called which API function of the underlying real time operating system (RTOS). The data visualization system 1110 can also generate various tables or graphs to facilitate user analysis of the embedded system. Detailed example user interface features of the data visualization system 1110 are described below with respect to user interfaces 1300, 1400a, 1400b in FIGS. 13, 14A and 14B.

Figure 11:
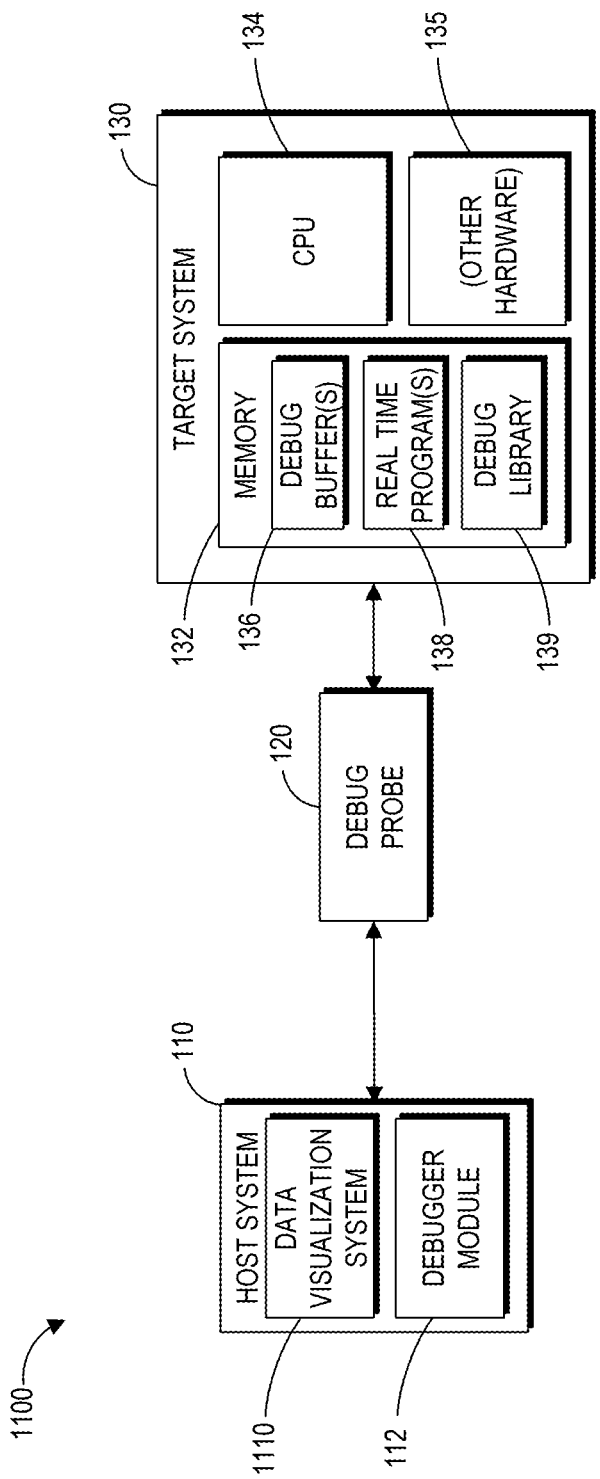
FIG. 11 depicts an embodiment of computing environments for communications between a host system and a target system.
Figure 12:
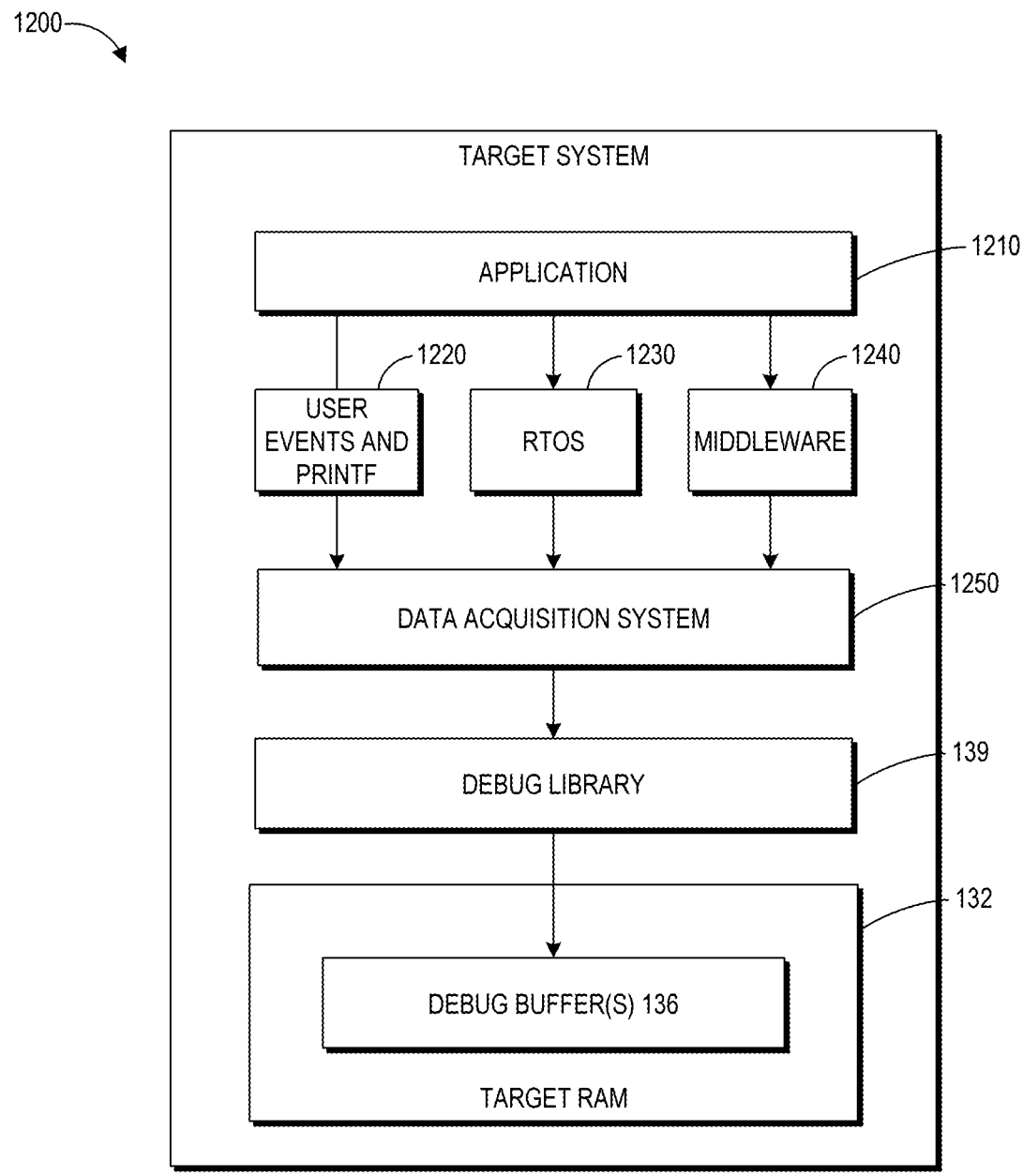
FIG. 12 depicts an example target system.

FIG. 11 depicts an embodiment of a computing environment for communications between a data visualization system 1110 and the target system 130. In FIG. 11, data generated by the target system 130 during a debugging process can be stored in the debug buffer(s) 136 as described above. For example, the target system 130 may include a software routine (or routines) that collects and formats the generated data during the debugging process. The software routine(s) may be part of the real time program(s) 138, a standalone program in the target system 130, and/or a part of the debug library 139. For example, as shown in FIG. 12, the software routine(s) may be a part of the data acquisition system 1250. The software routine(s) can communicate with the routines in the debug library 139 allowing the formatted data to be stored in the debug buffer(s) 136. In some embodiments, the data recording can occur without an instrumented operating system (OS) or without any OS on the target system 130. For example, the software routine(s) for data collection may be incorporated into the real time program(s) 138 to implement this process.

The data visualization system 1110 can read the debug buffer(s) 136 via the debug probe 120. The real time program(s) 138 can also send data to the data analysis system 1110 via the debug interface. Advantageously, in certain embodiments, these implementations do not require additional hardware (such as extra pins of the target system processor) to transmit the data generated by the target system 130. Although the examples in FIG. 11 are described using the debug probe 120, it should be noted that the debug probe 620 may also be used in certain implementations.

As described with reference to FIGS. 2 through 4, in some embodiments, the debug probe 120 can continuously read data from the debug buffer(s) 136 while other data are continuously written onto the debug buffer(s) 136. As a result, the data visualization system 1110 can continuously (or periodically) monitor, analyze, and visualize the acquired data in real time. In other implementations, when the target system 130 does not support real time transfer of data to the host system 110, the target system 130 can still write the data to its debug buffer(s) 136, but the data recording may stop when the debug buffer(s) 136 is full. Accordingly, the data transferred to the data visualization system 1110 may provide insight into the startup sequence or event-triggered activity in the target system 130 for a period of time (e.g., until the buffer is full). In another example, when the debug buffer(s) 136 is full, the target system 130 may overwrite earlier events recorded on the debug buffer(s) 136. As a result, the data transferred to the visualization system 1110 may include the latest recorded events, which may provide information on long-time target system 130 tests and may help analyze target system 130 crashes. In certain embodiments, the data visualization system 1110 can also periodically obtain data from specified addresses on the target system 130.

FIG. 12 depicts an example target system 1200. In this example, the target system 1200 is an example of the target system 130, and the application 1210 is an example of the real time program(s) 138 shown in FIG. 11. As described with reference to FIG. 11, the data acquisition system 1250 of the target system 1200 may include a software routine (or routines) that collects data of the target system 1200 when the application 1210 is running on the target system 1200. The target system 1200 can support the software routine(s) with an instrumented RTOS (see e.g. RTOS 1230), without an instrumented RTOS (such as, e.g., through middleware 1240 such as IP stack), or without any OS (such as, e.g., through user events or printf( ) function 1220 in the C language). The data acquisition system 1250 can format the collected data and pass it to the debug library 139. The debug library 139 may include an API that enables real time data transfer to the host system 110. The debug library 139 can also read and write data to and from the debug buffer(s) 136.

IX. Example Data Visualization System User Interfaces

Figure 13:
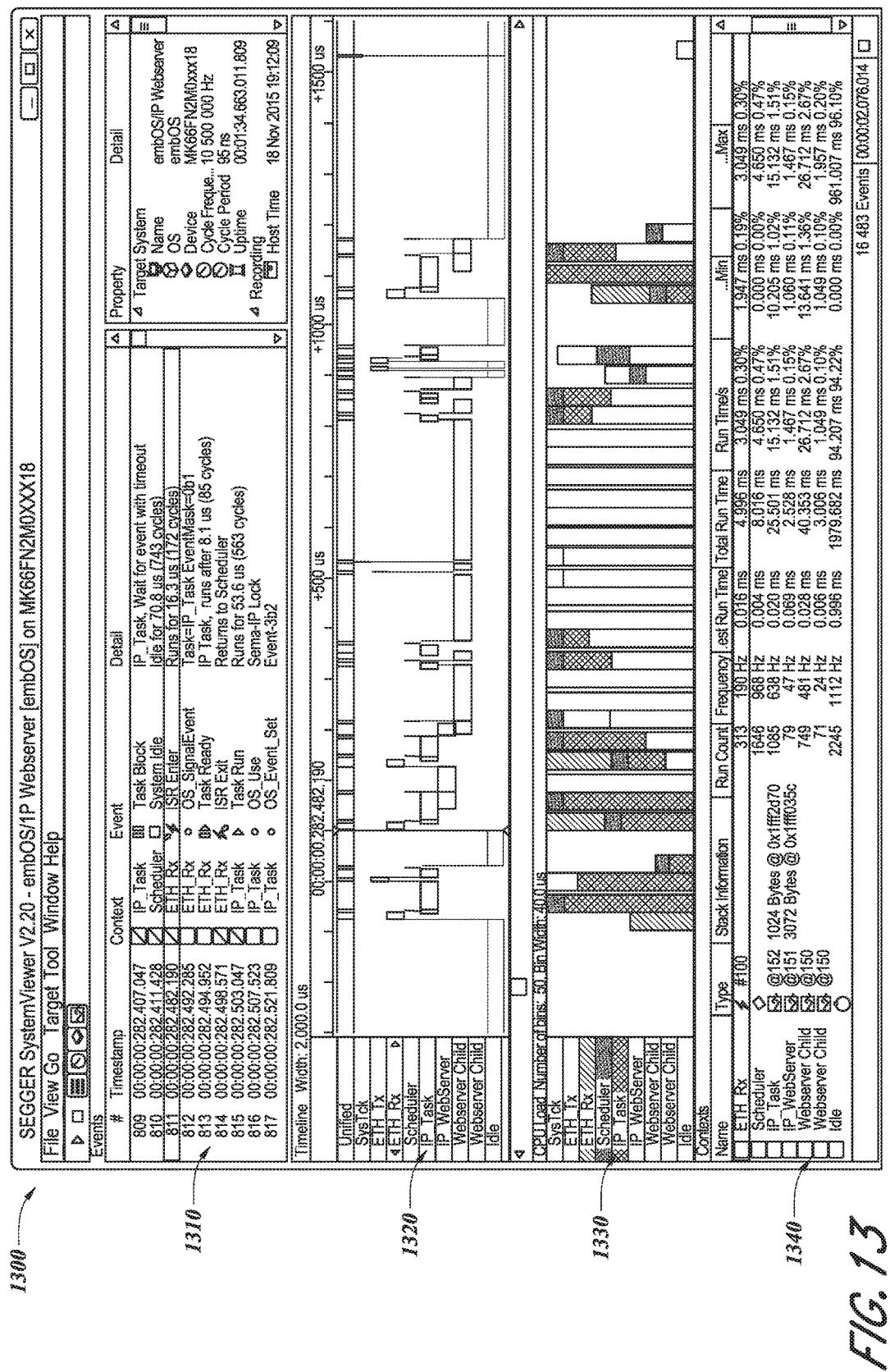
FIGS. 13, 14A, and 14B depict example user interfaces for the host system.
Figure 14A:
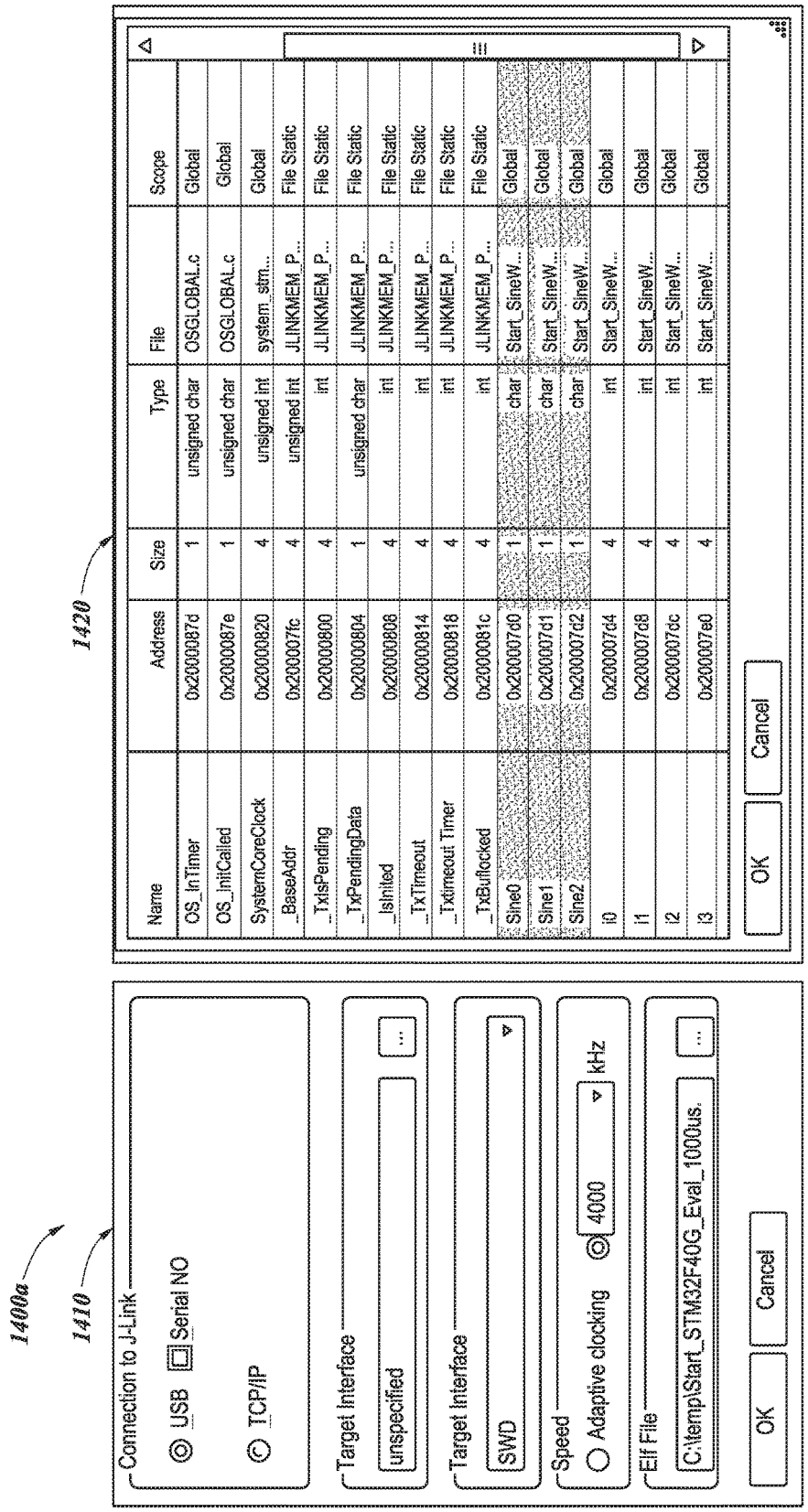
Figure 14B:
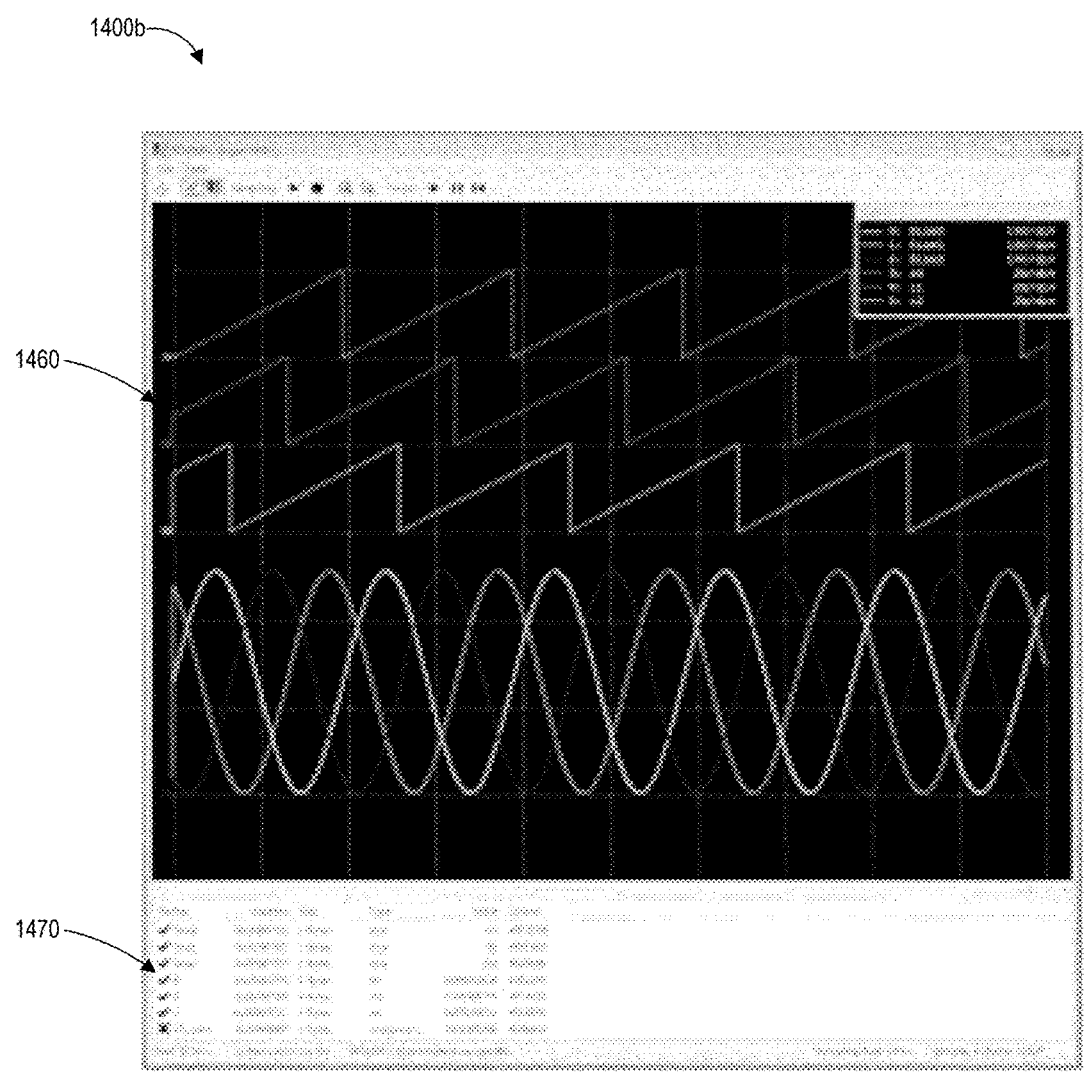

FIGS. 13 through 14B depict example user interfaces that may be output by the data visualization system 1110. Each of the user interfaces shown includes one or more user interface controls that can be selected by a user, for example, using a browser or other application software. Thus, each of the user interfaces shown may be output for presentation by the data visualization system 1110, which may optionally include a browser or any other application software. A user interface can include multiple display screens or multiple webpages. The user interface may also refer to a single display screen or web page in some implementations.

The user interface controls shown are merely illustrative examples and can be varied in other embodiments. For instance, buttons, dropdown boxes, select boxes, text boxes, check boxes, slider controls, and other user interface controls shown may be substituted with other types of user interface controls that provide the same or similar functionality. Further, user interface controls may be combined or divided into other sets of user interface controls such that similar functionality or the same functionality may be provided with very different looking user interfaces. Moreover, each of the user interface controls may be selected by a user using one or more input options, such as a mouse, touch screen input, controller, or keyboard input, among other user interface input options. Although each of these user interfaces are shown implemented in a mobile device, the user interfaces or similar user interfaces can be output by any computing device, examples of which are described above. The user interfaces described herein may be generated electronically by the data visualization system 1110.

FIG. 13 depicts an example system information user interface 1300 that may be generated by the data visualization system 1110. The system information user interface 1300 can be used to verify that the target system 130/1200 behaves as expected and to find problems and inefficiencies, such as, for example, superfluous and spurious interrupts or unexpected task changes.

In FIG. 13, the example user interface 1300 shown includes windows 1310, 1320, 1330, 1340. In window 1310, a table of event information is provided. The window 1310 can list some or all processor events which were recorded when the embedded system was running. The window can also display assorted information about an event, such as the timestamp of when the event was generated, in which task or interrupt context it happened, which event it is, and the details of the event. In some implementations, the user can filter the type of event information to be displayed.

Window 1320 shows a timeline for data recorded by the target system. The timeline may include information for interrupts and task activities, as well as scheduler activity (or idle) over the target system time. The user can scroll through the events. By zooming in on the timeline, a user can see how task activities and interrupts are connected. For example, the user can see how often interrupts occur; which interrupt starts which task; when tasks are interrupted; when the scheduler triggers a task switch; how long it takes for a task to run when it becomes ready; how long does an interrupt run, and so on.

Window 1330 shows information associated with the CPU load. For example, it displays the used CPU time by context over a period of time. This can provide insight as to how much CPU time is used when the system is active or idle. It can also provide an indicator for where the system might be inefficient, for example, when interrupts happen too often or simple computations take too long.

Window 1340 is a context window, which provides runtime information about tasks and interrupts. For example, window 1340 shows the frequency, run time information, and CPU load for each context. This information can be used for determining whether the system runs evenly, as well as for seeing an overview on where the CPU time is spent.

FIGS. 14A and 14B provide other examples of user interfaces that may be output by the data visualization system 1110. In the user interface 1400a in FIG. 14A, the user can choose a configuration for the data visualization system 1110 in the window 1410. For example, the user can choose the type of connections (such as USB, Serial No., TCP/IP, JTAG, JProbe, etc.) for acquiring data from the target system, a target device among a list of devices (to select a specific target system), a type of interface for debugging (such as, e.g., serial wire debug), and desired speed of transfer. The user can also choose which file to load on the host system from the window 1410. As shown in FIG. 14A, the user chooses an Executable Linkable Format (elf) file from the C drive. The elf file can include information of variables such as symbols, data linkage and relocation, and other information used for runtime execution of the file.

When the user clicks the "ok" button in the window 1410, the data visualization system 1110 can read the elf file and provide the window 1420 to the user. The window 1420 provides a list of variables and information (such as, e.g., name, address, size, type, file, and scope) associated with each variable. The user can select variables to be shown by the data visualization system 1110. As indicated in the window 1420, the user has selected variable sine0, sine1, and sine2. Once the user has configured the variables, the host system can store the configuration in a file for later re-use or for later transfer to a different hardware medium. In some embodiments, the configuration does not have to be specified by the user.

When the user confirms the selection of the variables, the data visualization system 1110 can communicate with the target system 130 via the debug probe 120 to begin recording data. The data visualization system 1110 can provide visual analysis of recorded data in the user interface 1400b shown in FIG. 14B. The user interface 1400b shows the value of multiple variables using a software oscilloscope format. For example, the user interface 1400b may present waveforms that represent changing values of the target system data over time. In some embodiments, each variable may be configured separately. For example, the user can choose whether to visualize the variables in the graph 1460 or show their value in the watch panel 1470. The user can also interact with the graph 1460 by moving the graph up and down to change the zero-base-line, changing its resolution, scrolling through the visualized graphs, zooming in and out, or the like. The user can save the data to a file for further analysis.

X. Additional Embodiments

It should be noted that the terminal output features of writing to the debug buffer by the target system can be used by directly calling a debug subroutine in the debug library 139 or by replacing the low-level native function called by a routine for printing a formatted string. An example routine for printing a formatted string is the "printf( )" routine in the C programming language (which is also used in other languages such as C++, Java, and the like). The printf( ) routine, when called, implements an output of a text string by calling a low-level native function provided by the compiler or embedded software development tool chain. The low-level native function can be replaced with a call to an appropriate debug subroutine. Thus, a call to "printf( )" in the target system's program 138 can execute any of the features for writing to the debug buffer described above.

Thus, for example, the following call may either print using printf( )s normal functionality or the modified functionality described above: printf("The current voltage is % d.%.2V", mV/1000, mV%1000). Alternatively, this may be accomplished with a call to a debug routine such as is follows: SEGGER_RTT_WriteString("Hello world") (see below Example Code).

It should also be noted that the debug library 139 can disable interrupts during output to create thread-safe conditions and even interrupt-safe conditions. Disabling interrupts can prevent or reduce the chance that two threads or processes write to the same debug buffer at the same time, resulting in junk data or overwriting of valid data that has not yet been read. Thus, in one embodiment, the debug library 139 disables interrupts before writing to a debug buffer and restores interrupt capability after writing to the debug buffer. In one implementation, the debug library 139 sets a buffer flag prior to writing to a buffer and clears the buffer flag after writing to the buffer. Any interrupt can be put on hold until the CPU has determined that the buffer flag has cleared.

XI. Example Circular Buffer Implementations

The cyclic or circular buffers (sometimes called ring buffers) described herein can be implemented in any of a variety of ways.

A small disadvantage of relying on pointers or relative indices of the start and end of data for these buffers is, that in the case the buffer is entirely full, both pointers point to the same element. To solve this confusion there are a number of solutions, each of which is described in greater detail below, and any of which can be used in place of or in addition to any of the features described above:

Always keep one slot open.
Use an extra mirroring bit to distinguish the two cases.
Use read and write counts to get the fill count from.
Use absolute indices.
Record last operation.
Multiple read pointers.
Chunked buffer.

Always Keep One Slot Open:

This design always keeps one slot unallocated. A full buffer has at most (buffersize−1) slots. If both pointers refer to the same slot, the buffer is empty. If the end (write) pointer refers to the slot preceding the one referred to by the start (read) pointer, the buffer is full. This solution is represented in the code example presented herein and described in more detail above.

Mirroring:

Another solution is to remember the number of times each read and write pointers have wrapped and compare this to distinguish empty and full situations. In fact only the parity of the number of wraps is necessary, so the system may keep an extra bit. This can be seen as if the buffer adds a virtual mirror and the pointers point either to the normal or to the mirrored buffer.

Read/Write Counts:

Another solution is to keep counts of the number of items written to and read from the circular buffer. Both counts are stored in signed integer variables with numerical limits larger than the number of items that can be stored and are allowed to wrap freely. The unsigned difference (write_count−read_count) can yield the number of items placed in the buffer and not yet retrieved. This can indicate that the buffer is empty, partially full, completely full (without waste of a storage location) or in a state of overrun. This example implementation is described above as an embodiment using counters.

Absolute Indices:

It is possible to improve or otherwise optimize the previous solution by using indices instead of pointers: indices can store read/write counts instead of the offset from start of the buffer, the separate variables in the above solution may be removed and relative indices may be obtained on the fly by division modulo the buffer's length.

Record Last Operation: Another solution is to keep a flag indicating whether the most recent operation was a read or a write. If the two pointers are equal, then the flag can show whether the buffer is full or empty: if the most recent operation was a write, the buffer must be full, and conversely if it was a read, it must be empty.

Multiple Read Pointers:

A little bit more complex are multiple read pointers on the same circular buffer. This is useful if the target system has n threads, which are reading from the same buffer, but one thread is writing to the buffer.

Chunked Buffer:

Much more complex are different chunks of data in the same circular buffer. The writer is not only writing elements to the buffer, it also assigns these elements to chunks. The reader should not only be able to read from the buffer, it should also get informed about the chunk borders. Example: The writer is reading data from small files, writing them into the same circular buffer. The reader is reading the data, but wants to know when and which file is starting at a given position.

XII. Example Code

The computer program listing listed in the computer program listing appendix can be implemented by any of the hardware systems described above. For example, the computer program listing listed in the computer program listing appendix can be used on the target system for output of text messages as described above.

XIII. Terminology

Many other variations than those described herein can be apparent from this disclosure. For example, depending on the embodiment, certain acts, events, or functions of any of the algorithms described herein can be performed in a different sequence, can be added, merged, or left out altogether (e.g., not all described acts or events may be necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality can be implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine or hardware processor, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, can be generally intended to convey that certain embodiments include, while other embodiments do not include, certain features, elements and/or states. Thus, such conditional language can be not generally intended to imply that features, elements and/or states may be in any way required for one or more embodiments or that one or more embodiments necessarily include logic for deciding, with or without author input or prompting, whether these features, elements and/or states may be included or may be to be performed in any particular embodiment. The terms "comprising," "including," "having," and the like may be synonymous and may be used inclusively, in an open-ended fashion, and do not exclude additional elements, features, acts, operations, and so forth. Also, the term "or" can be used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" can be applied.

Disjunctive language such as the phrase "at least one of X, Y, or Z," unless specifically stated otherwise, can be otherwise understood with the context as used in general to present that an item, term, etc., may be either X, Y, or Z, or any combination thereof (e.g., X, Y, and/or Z). Thus, such disjunctive language can be not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be implemented within a form that does not provide all of the features and benefits set forth herein, as some features can be used or practiced separately from others.

What is claimed is:

1. A system for debugging a target embedded system, the system comprising:
 a memory device, the memory device configured to store at least a debugger program; and
 a hardware processor, the hardware processor configured to:
  execute the debugger program, the debugger program configured to read data from a debug buffer of the target embedded system using a write pointer set by a debug library of the target embedded system after the debug library writes the data to the debug buffer;
  determine that a first interrupt and a first task executed using the data read from the debug buffer; and
  output a user interface that depicts, in a first pane, a timeline of the data read from the debug buffer, wherein the timeline includes a first horizontal bar corresponding to the first interrupt and a first time period, and wherein the timeline includes a second horizontal bar corresponding to the first task and a second time period that occurs after the first time period,
  wherein the user interface further depicts, in a second pane, a vertical bar depicting a used CPU time associated with the first interrupt and a used CPU time associated with the first task.

2. The system of claim 1, wherein the hardware processor is further configured to determine that a first scheduler activity occurred using the data read from the debug buffer.

3. The system of claim 2, wherein the timeline further includes a third horizontal bar corresponding to the first scheduler activity and a third time period that occurs after the second time period.

4. The system of claim 1, wherein the user interface further depicts a used CPU time associated with the first interrupt and a used CPU time associated with the first task.

5. The system of claim 1, wherein the user interface further depicts a second vertical bar that represents a used CPU time when the target embedded system is active and a third vertical bar that represents a used CPU time when the target embedded system is idle.

6. The system of claim 1, wherein the user interface further depicts a list of processor events recorded when the target embedded system was running.

7. The system of claim 6, wherein the list of processor events comprises a first processor event and a second processor event, and wherein the user interface further depicts a window identifying that the first processor event occurred during the first interrupt and that the second processor event occurred during the first task.

8. The system of claim 1, wherein the user interface further depicts at least one of a frequency, run time information, or CPU load for the first interrupt.

9. The system of claim 1, wherein the hardware processor is further configured to:
 output a second user interface that depicts a list of variables in response to a user selecting a file to load;
 obtain a selection of a first variable in the list of variables depicted in the second user interface; and
 output a third user interface that depicts a value of the first variable in an oscilloscope format using the data read from the debug buffer.

10. A system for debugging a target embedded system, the system comprising:
 a memory device, the memory device configured to store computer instructions for a data visualization system; and
 a hardware processor in communication with the memory device, wherein the computer instructions, when executed by the hardware processor, cause the system to:
  read data from a debug buffer of the target embedded system using a write pointer set by a debug library of the target embedded system after the debug library writes the data to the debug buffer;
  determine that a first interrupt executed using the data read from the debug buffer; and
  output a user interface that depicts, in a first pane, a timeline of the data read from the debug buffer, wherein the timeline includes a first horizontal bar corresponding to the first interrupt and a first time period,
  wherein the user interface further depicts, in a second pane, a vertical bar depicting a used CPU time associated with the first interrupt and a used CPU time associated with a first task.

11. The system of claim 10, wherein the computer instructions, when executed, further cause the system to determine that a first scheduler activity occurred using the data read from the debug buffer.

12. The system of claim 11, wherein the timeline further includes a second horizontal bar corresponding to the first scheduler activity and a second time period that occurs after the first time period.

13. The system of claim 10, wherein the user interface further depicts a used CPU time associated with the first interrupt.

14. The system of claim 10, wherein the user interface further depicts a second vertical bar that represents a used CPU time when the target embedded system is active and a third vertical bar that represents a used CPU time when the target embedded system is idle.

15. The system of claim 10, wherein the user interface further depicts an indication of a first processor event recorded when the target embedded system was running, wherein the user interface further depicts a window identifying that the first processor event occurred during the first interrupt.

16. The system of claim 10, wherein the hardware processor is further configured to:
    output a second user interface that depicts a list of variables in response to a user selecting a file to load;
    obtain a selection of a first variable in the list of variables depicted in the second user interface; and
    output a third user interface that depicts a value of the first variable in an oscilloscope format using the data read from the debug buffer.

17. A computer-implemented method for debugging a target embedded system, the computer-implemented method comprising:
    retrieving data from a debug buffer of the target embedded system via a debug probe using a write pointer set by a debug library of the target embedded system after the debug library writes the data to the debug buffer;
    determining that a first interrupt and a first task executed based on the retrieved data; and
    outputting, with a hardware process, a user interface that depicts, in a first pane, a timeline of the retrieved data, wherein the timeline includes a first horizontal bar corresponding to the first interrupt and a first time period, and wherein the timeline includes a second horizontal bar corresponding to the first task and a second time period that occurs after the first time period,
    wherein the user interface further depicts, in a second pane, a vertical bar depicting a used CPU time associated with the first interrupt and a used CPU time associated with the first task.

18. The computer-implemented method of claim 17, further comprising determining that a first scheduler activity occurred based on the retrieved data.

19. The computer-implemented method of claim 18, wherein the timeline further includes a third horizontal bar corresponding to the first scheduler activity and a third time period that occurs after the second time period.

20. The computer-implemented method of claim 17, further comprising:
    outputting a second user interface that depicts a list of variables in response to a user selecting a file to load;
    obtaining a selection of a first variable in the list of variables depicted in the second user interface; and
    subsequent to retrieving the data, outputting a third user interface that depicts a value of the first variable in an oscilloscope format.

* * * * *